March 2, 1943.    R. J. MILLER    2,312,663
MOTION PICTURE PROJECTOR
Filed Jan. 11, 1939    11 Sheets-Sheet 2
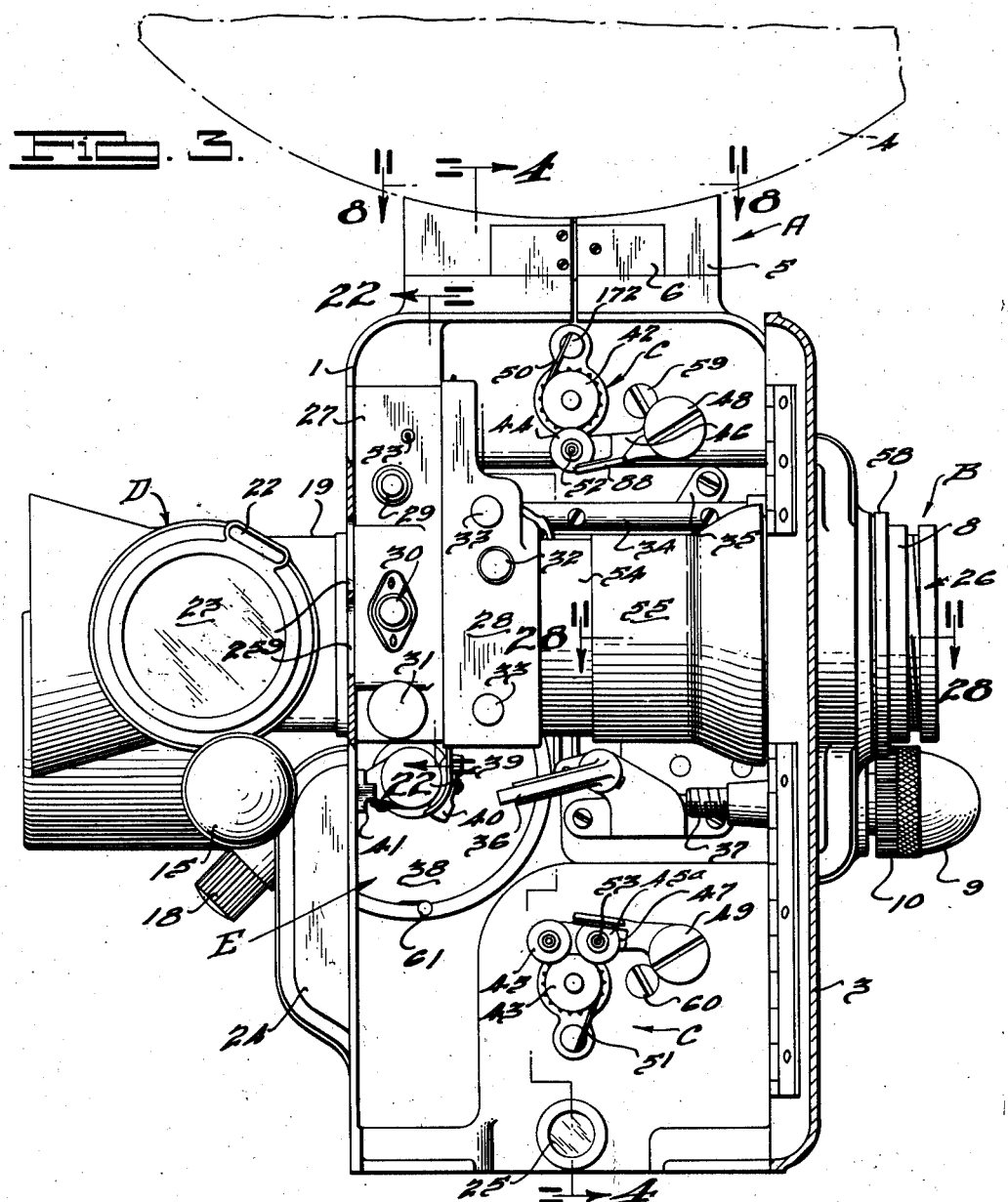
INVENTOR
Raymond J. Miller.
BY Dike, Calver & Gray
ATTORNEYS.

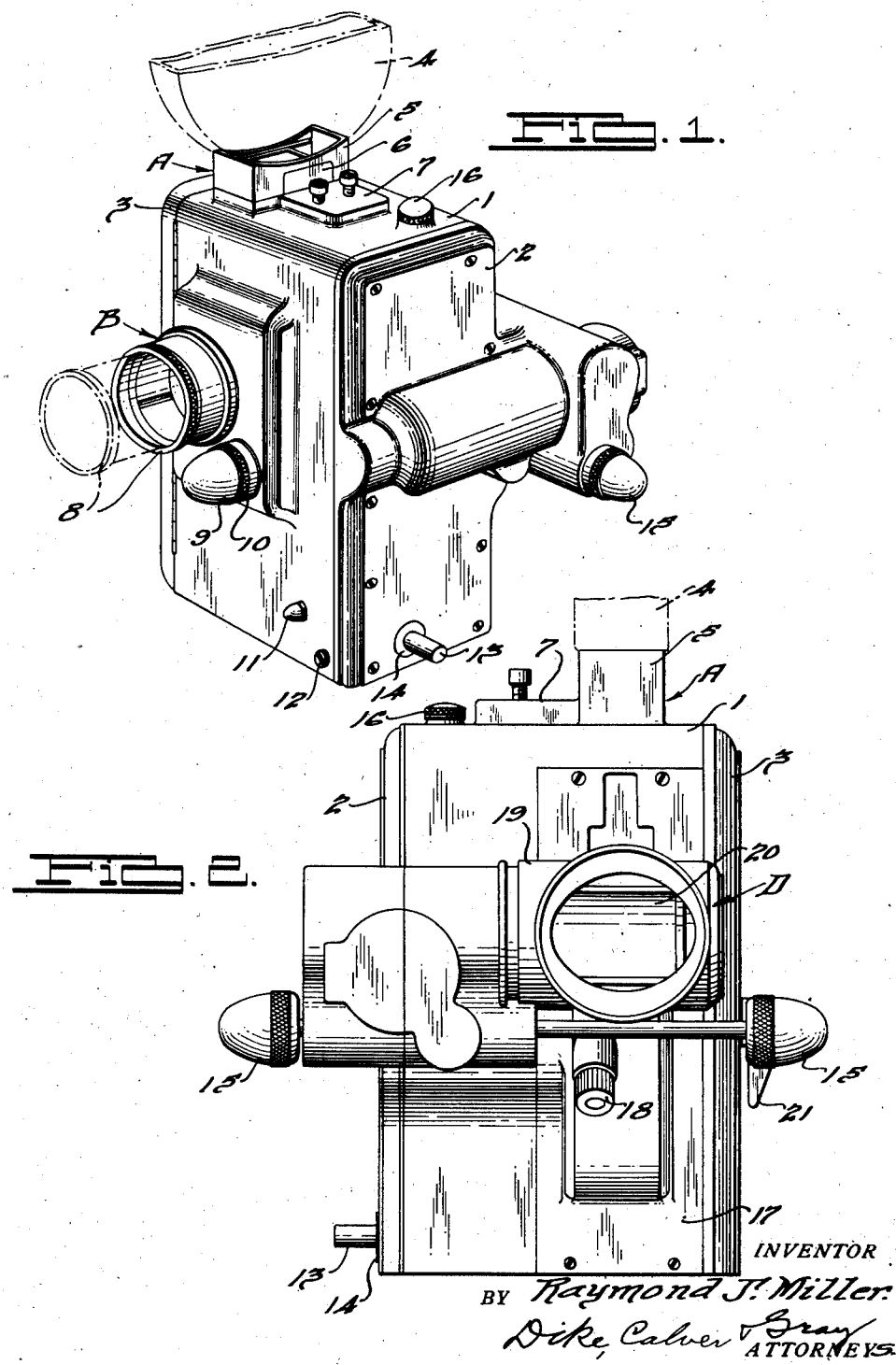

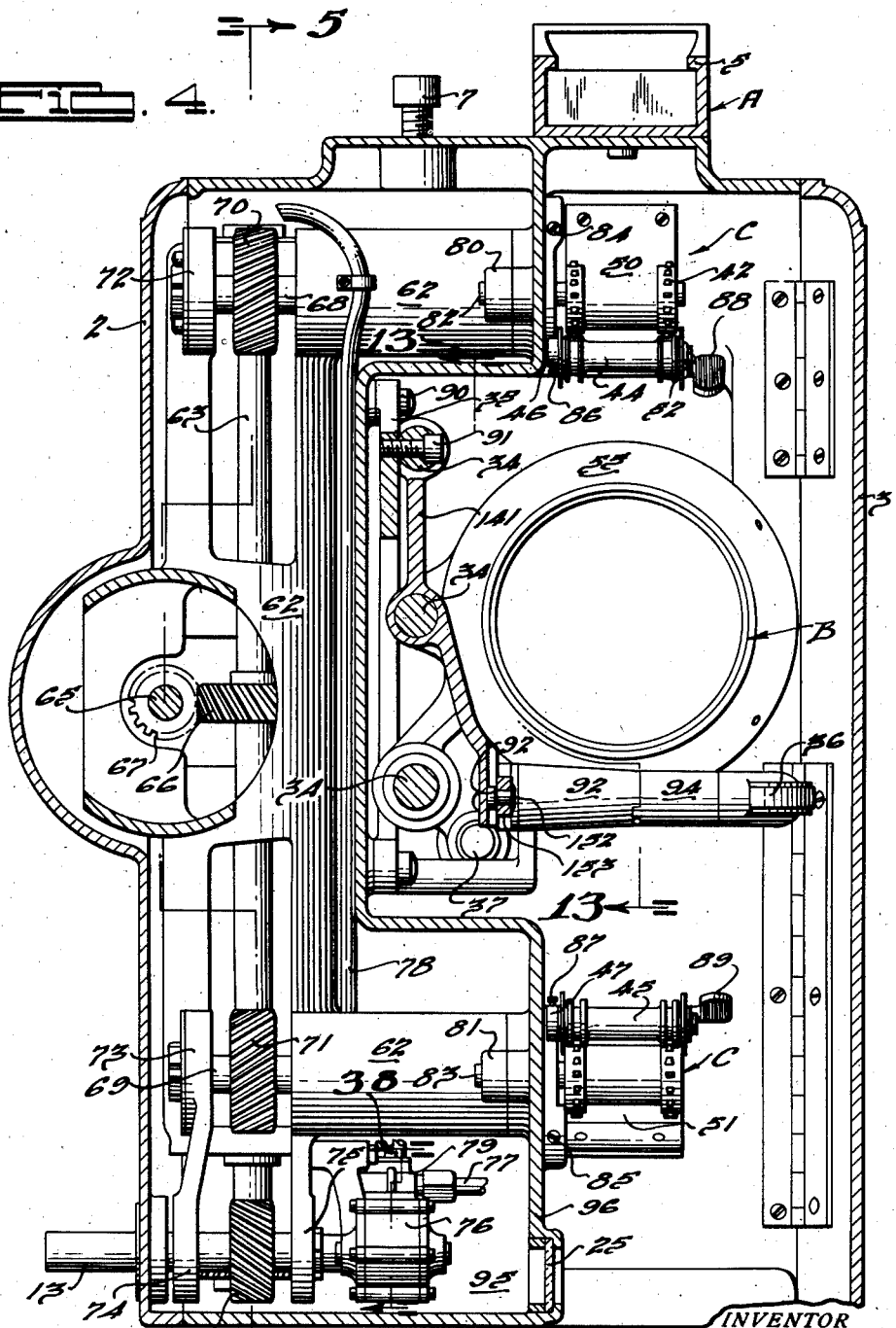

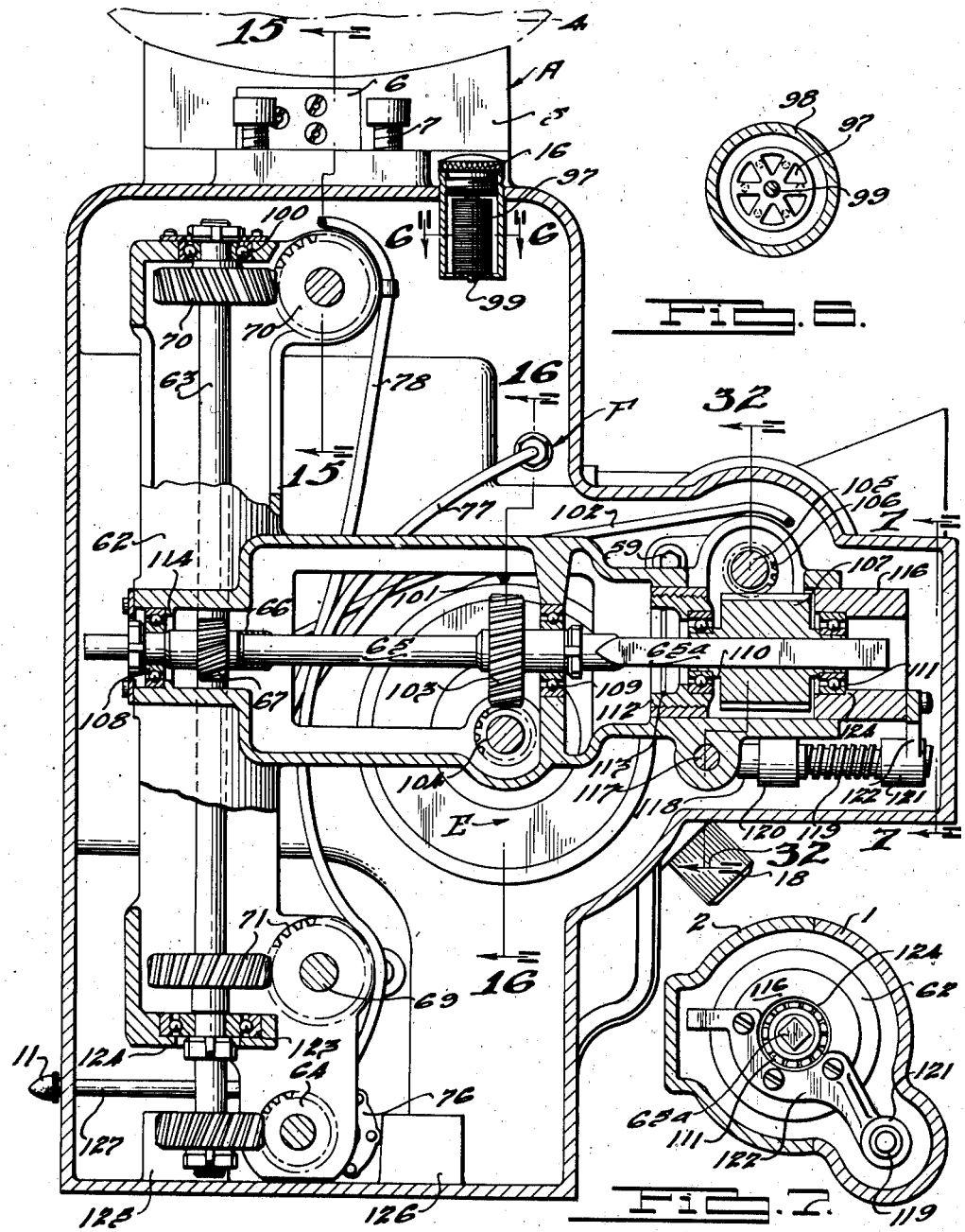

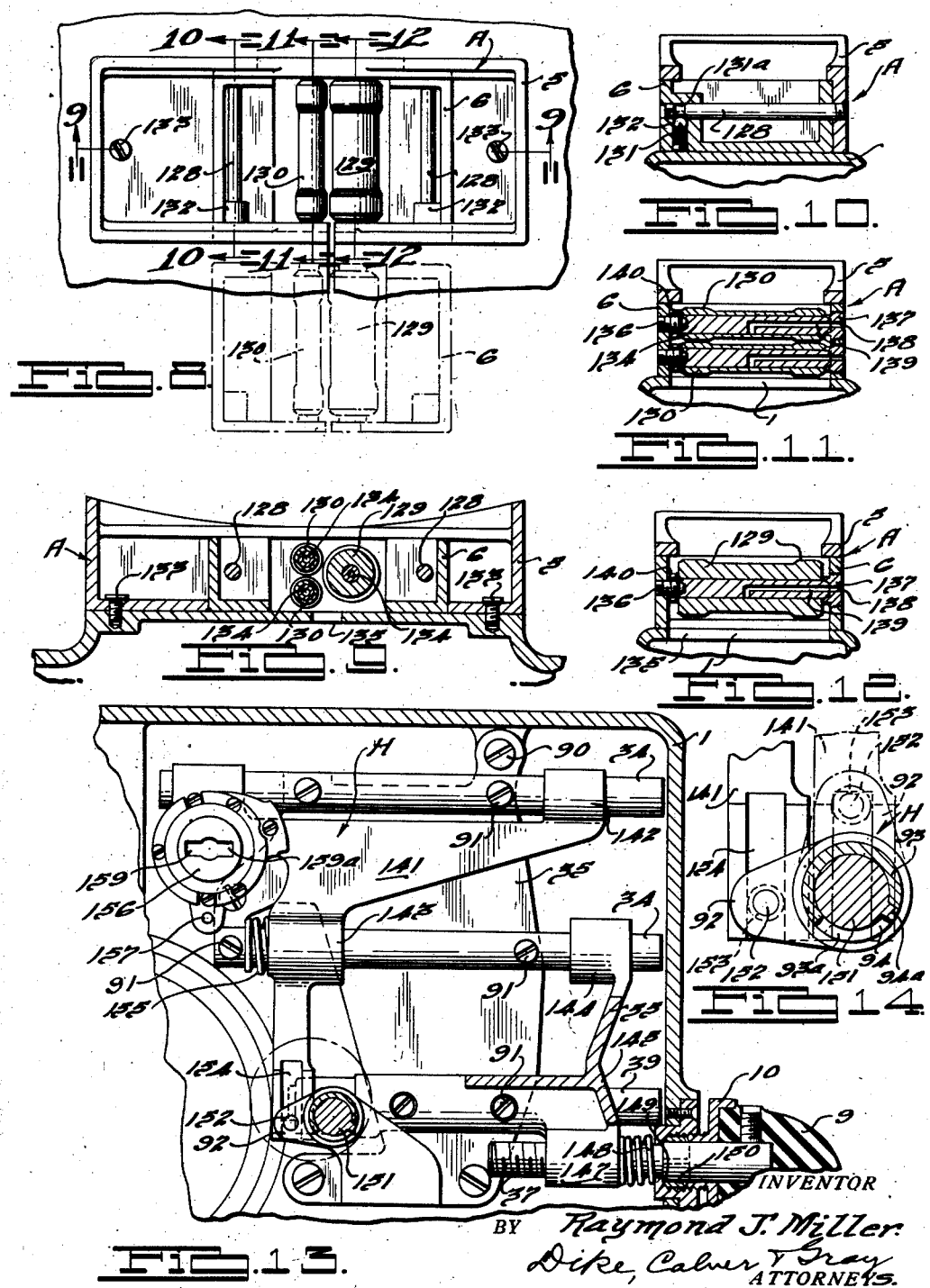

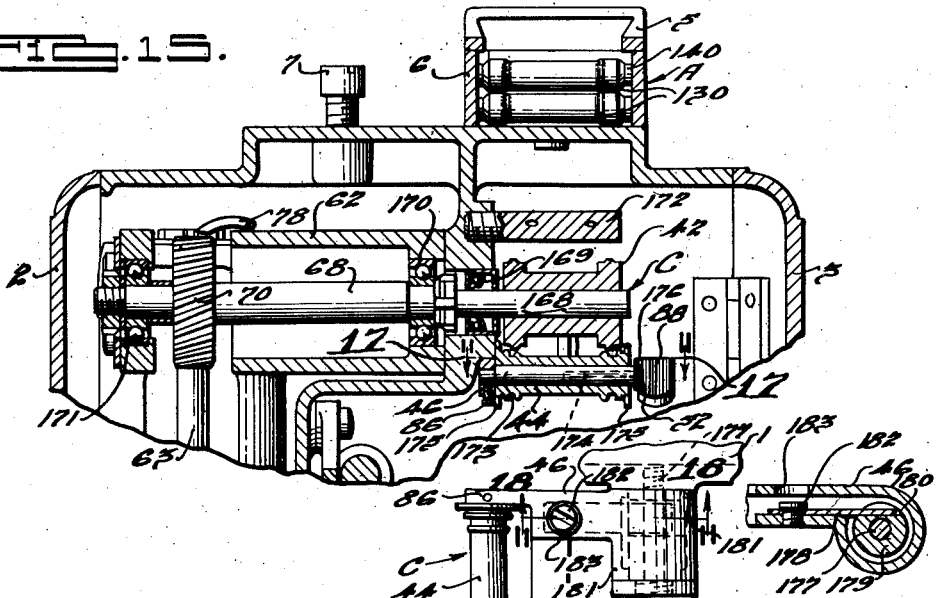
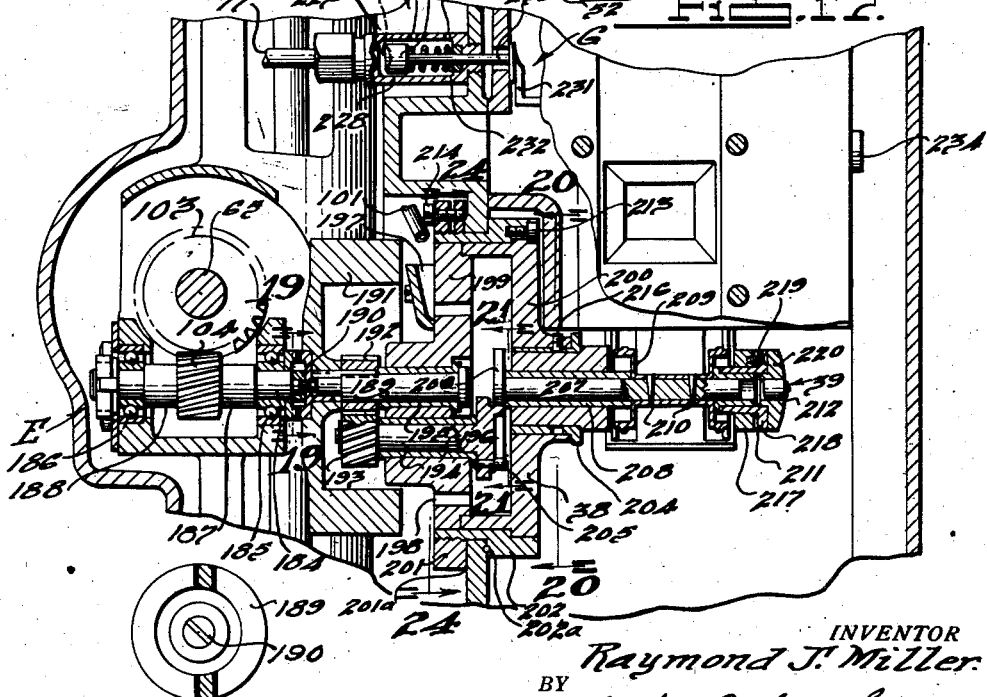

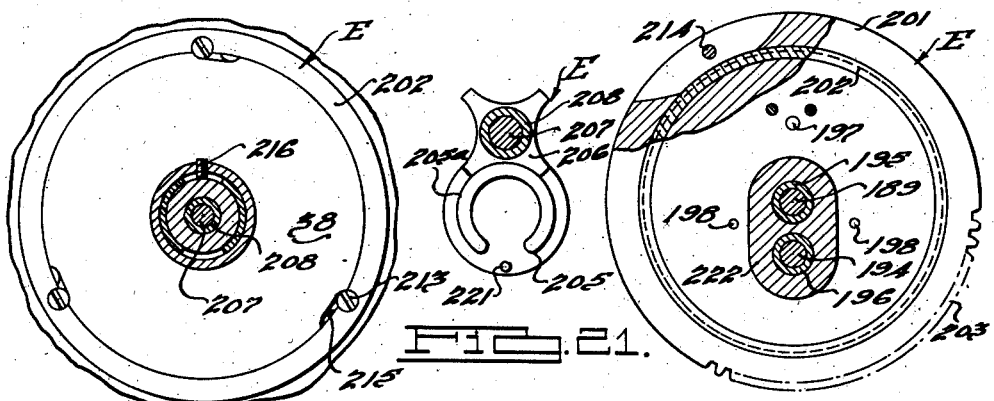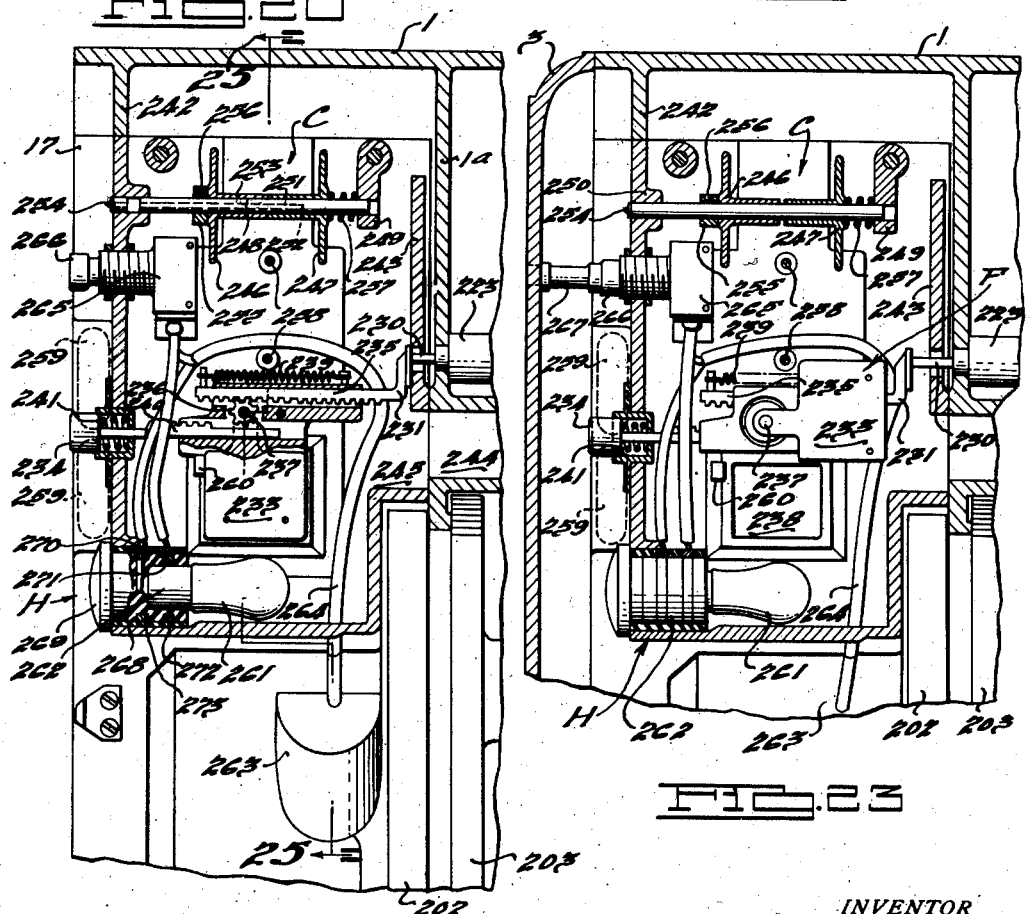

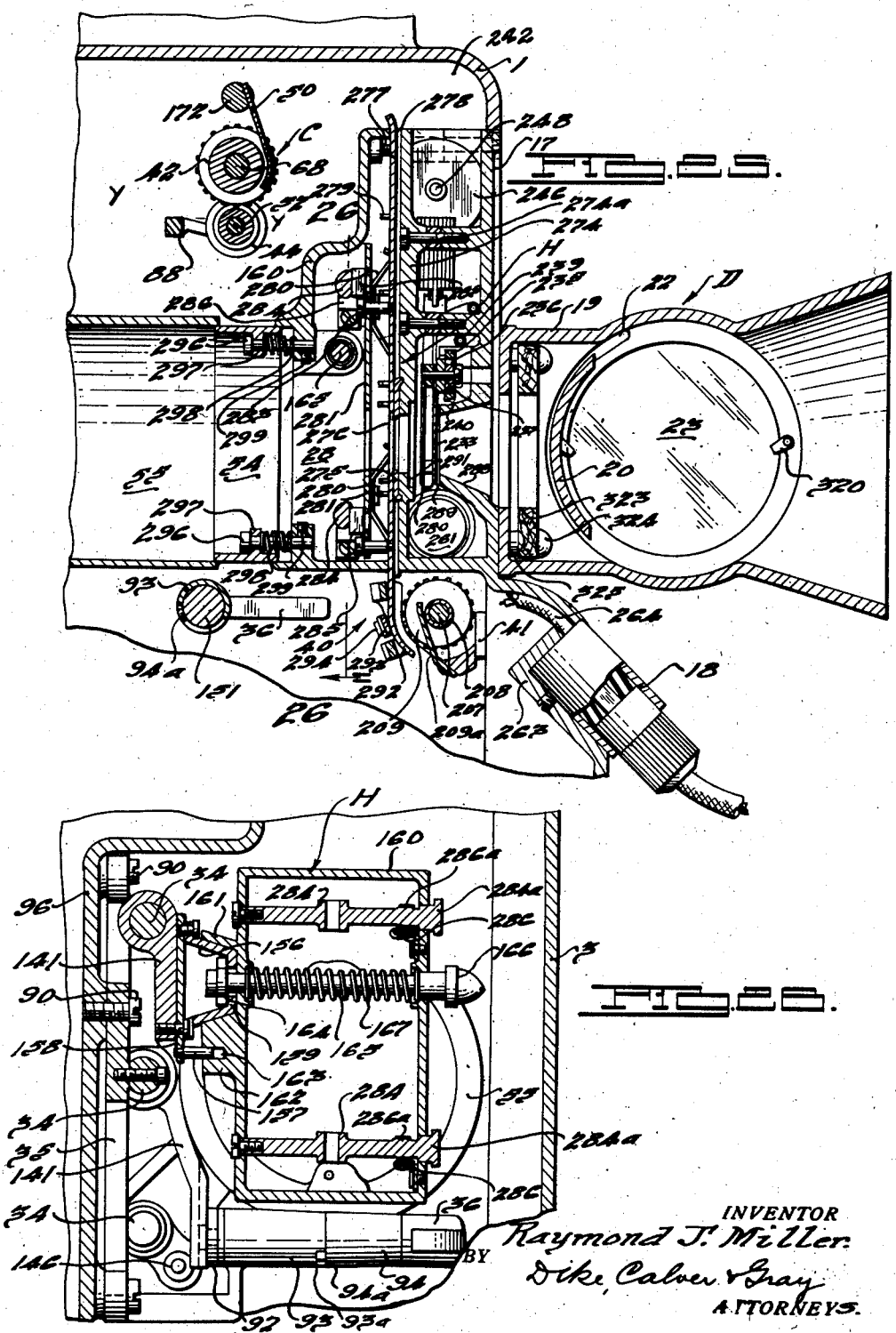

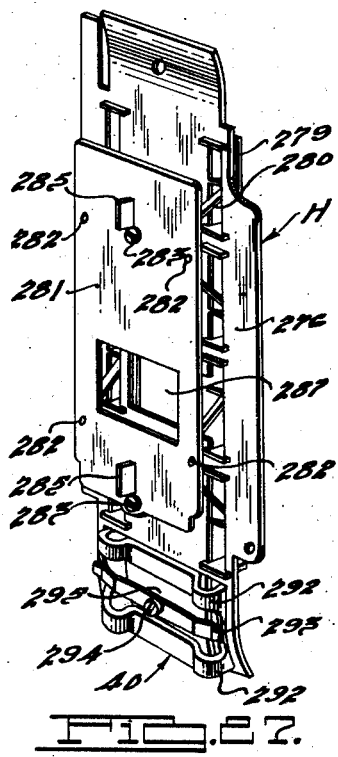
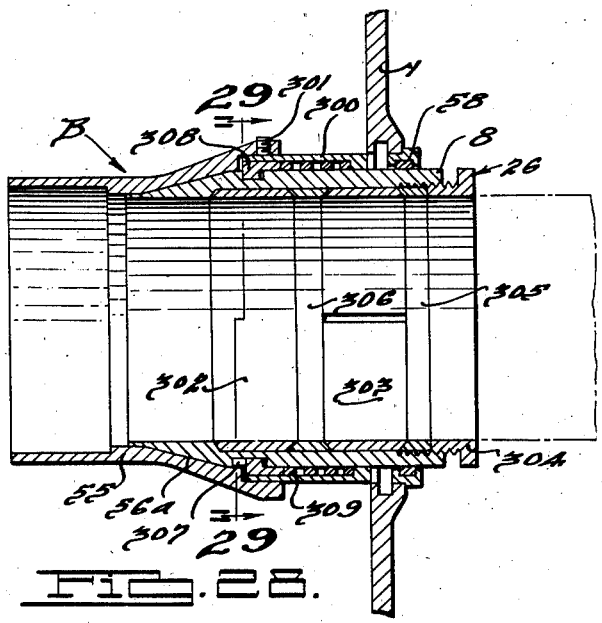
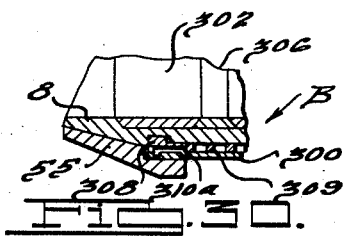
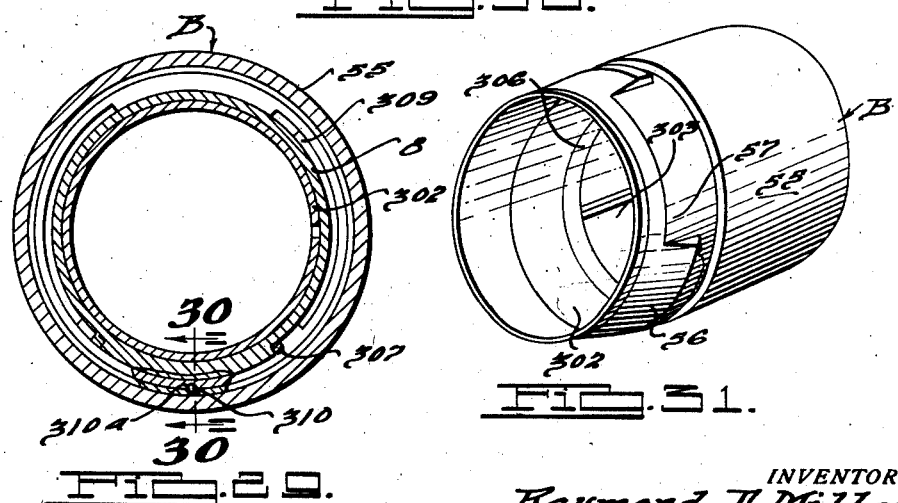

Patented Mar. 2, 1943

2,312,663

UNITED STATES PATENT OFFICE 2,312,663

MOTION PICTURE PROJECTOR

Raymond J. Miller, Detroit, Mich., assignor to American Pattern and Manufacturing Co., Detroit, Mich., a copartnership consisting of said Miller and Alfred E. Wilson Application January 11, 1939, Serial No. 250,310

4 Claims. (Cl. 88—17)

The present invention relates to improvements in a projector head for a motion picture projector and particularly to improvements in the various assemblies and sub-assemblies of elements which in combination produce a new and useful projector head for projecting intermittently a succession of separate images whereby an illusion of motion is created.

The projector head of the present invention is intended to project the visual images from a continuous strip of film and is designed to be used as one element of a complete projector assembly which includes the film magazine, the sound projection head and the illumination source. Since the invention herein disclosed relates to the motion picture projection head per se and not to the other elements of the completed projector, the head alone is shown and described in the present application, it being understood by those skilled in the art that the head embodying the present invention may be used in combination with the other elements required for the complete projection of visual images synchronized with sound.

It is among the objects of the present invention to provide a motion picture projector head of simplified design and construction, which is adapted for economical production, service and operation and in which the various component assemblies and sub-assemblies of elements are of improved design and construction and are combined to produce a motion picture projector head having improved operating qualities.

Other objects and advantages of this invention will appear in the following description and appended claims, reference being had to the accompanying drawings forming a part of this specification wherein like reference characters designate corresponding parts in the several views, and in which Fig. 1 is a view in perspective of a projector head embodying the present invention and showing the front and non-operating side of the projector head.

Fig. 2 is a rear elevation of the projector head shown in Fig. 1.

Fig. 3 is an enlarged side elevation of a projector head embodying the present invention with parts broken away and showing the operating door in the open position to reveal the interior arrangement of the projector head shown in Fig. 1.

Fig. 4 is a staggered section taken substantially on the line 4—4 of Fig. 3 in the direction of the arrows.

Fig. 5 is a section taken substantially on the line 5—5 of Fig. 4 in the direction of the arrows and showing a cross section through the entire projector head substantially at the center axis of the horizontal operating shaft.

Fig. 6 is a section taken substantially on the line 6—6 of Fig. 5 in the direction of the arrows and showing a cross section through the oil filler and filter capsule.

Fig. 7 is a section taken substantially on the line 7—7 of Fig. 5 in the direction of the arrows and showing a cross section through the back cover and main housing showing the end of the compensation slide housing.

Fig. 8 is a section taken substantially on the section line 8—8 of Fig. 3 in the direction of the arrows and showing a top plan view of the magazine adapter with the fire valve roller carrier tray in position, the dotted line view showing the tray in its removed position.

Fig. 9 is a cross section taken substantially on the line 9—9 of Fig. 8 in the direction of the arrows.

Figure 32:
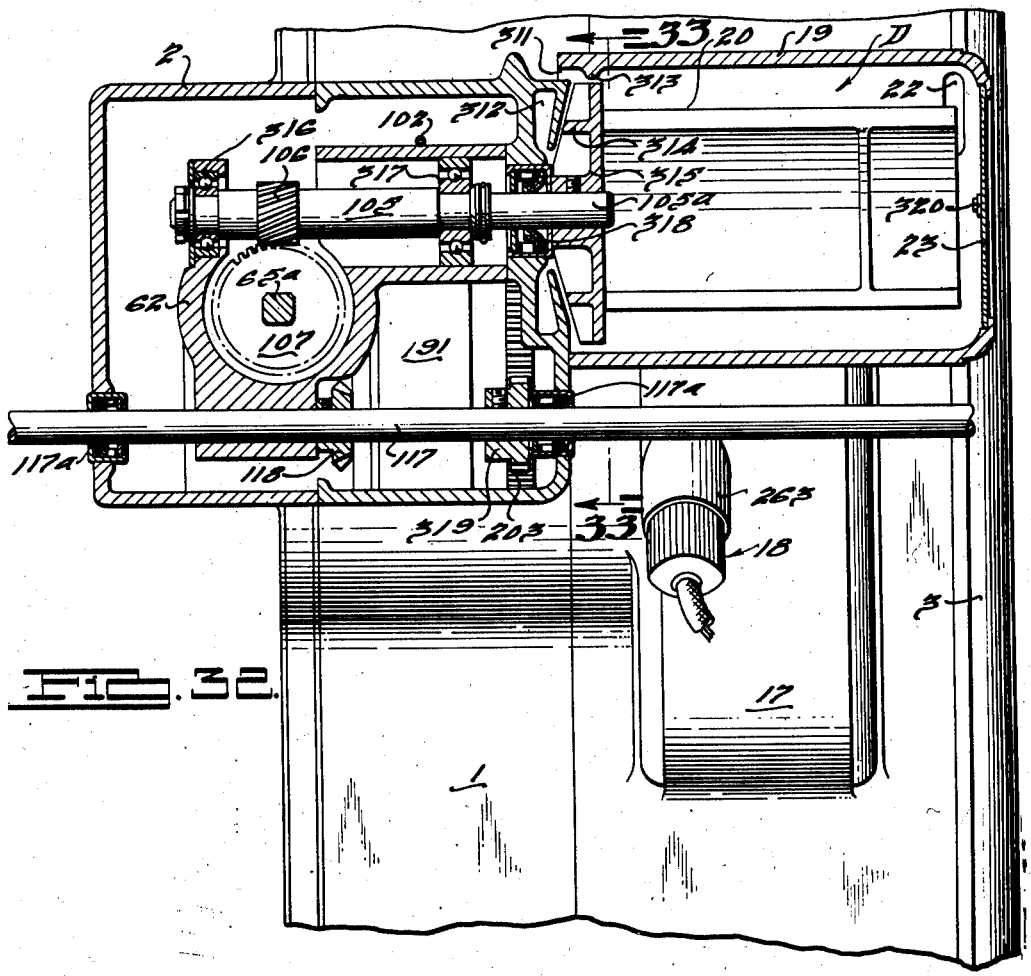

Figs. 10, 11 and 12 are each sectional views taken substantially on the respective lines 10—10, 11—11 and 12—12 of Fig. 8, each view being taken in the direction of the arrows.

Fig. 13 is a fragmentary sectional view taken substantially on the staggered section line 13—13 of Fig. 4 in the direction of the arrows and showing the focusing mechanism and adjustment.

Fig. 14 is an enlarged section of the portion of the projector head shown in the circle 14—14 of Fig. 13 and showing the action of the locking cam on actuation of the aperture carrier.

Fig. 15 is a fragmentary section taken substantially on the line 15—15 of Fig. 5, which passes through the projector substantially at the center line of the upper feed sprocket.

Fig. 16 is a fragmentary section taken substantially on the staggered line 16—16 of Fig. 5 in the direction of the arrows and showing the hydraulic control cylinder of the fire shutter and a cross section through the intermittence movement.

Fig. 17 is a top plan view taken substantially on the line 17—17 of Fig. 15 in the direction of the arrows and showing a top view of the carrier arm for the sprocket guide roller.

Fig. 18 is a fragmentary section taken substantially on the line 18—18 of Fig. 17 in the direction of the arrows and showing a side cross sectional view of the sprocket roller arm.

Fig. 19 is a cross section taken substantially on the line 19—19 of Fig. 16 and showing a cross section through the spline connection between the drive shaft and the intermittence movement flywheel.

Fig. 20 is a section taken substantially on the line 20—20 of Fig. 16 in the direction of the arrows and showing the intermittence housing from the front view with a cross section through the eccentric adjustment ring.

Fig. 21 is a cross section taken substantially on the line 21—21 of Fig. 16 and showing the relationship of the star and cam of the Geneva movement.

Fig. 22 is a fragmentary section taken substantially on the line 22—22 of Fig. 3 in the direction of the arrows and showing a cross section taken through the fire trap of the aperture plate substantially at the point of the guide rollers. This view is taken from the front of the machine with the fire shutter in the closed position.

Fig. 23 is a view similar to Fig. 22 but showing the fire shutter in the open position.

Fig. 24 is a section taken on the staggered section line 24—24 of Fig. 16 in the direction of the arrows and showing the relationship of the segment ring to the intermittence movement.

Fig. 25 is a fragmentary section taken substantially on the staggered line 25—25 of Fig. 22 in the direction of the arrows and showing a cross section of the projector head taken substantially through the center axis of the lens carrier.

Fig. 26 is a fragmentary section taken substantially on the line 26—26 of Fig. 25 and showing a cross section taken substantially through the aperture pressure plate housing at approximately the center line of the attachment cone.

Fig. 27 is a view in perspective of the adjustable spring plate and the alignment aperture pressure plate.

Fig. 28 is a fragmentary section taken substantially on the line 28—28 of Fig. 3 in the direction of the arrows and showing a cross section through the lens carrier and the lens withdrawal tube.

Fig. 29 is a sectional view taken substantially on the line 29—29 of Fig. 28 in the direction of the arrows and showing a cross section through the lens carrier.

Fig. 30 is a fragmentary section taken substantially on the line 30—30 of Fig. 29 in the direction of the arrows and showing a cross section through the lens carrier.

Fig. 31 is a view in perspective showing the withdrawal ring forming a part of the lens carrier assembly and showing the indexing slots and locating taper construction.

Fig. 32 is a fragmentary section taken substantially on the staggered line 32—32 of Fig. 5 and showing a cross section taken substantially through the shutter.

Figure 33:
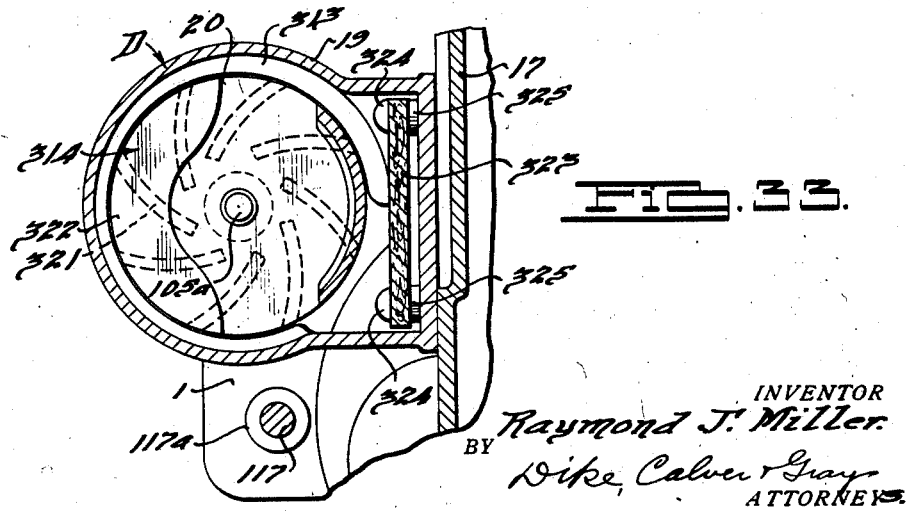

Fig. 33 is a fragmentary section taken substantially on the line 33—33 of Fig. 32 in the direction of the arrows and showing a cross section through the shutter and housing looking toward the impeller plate.

Figure 34:
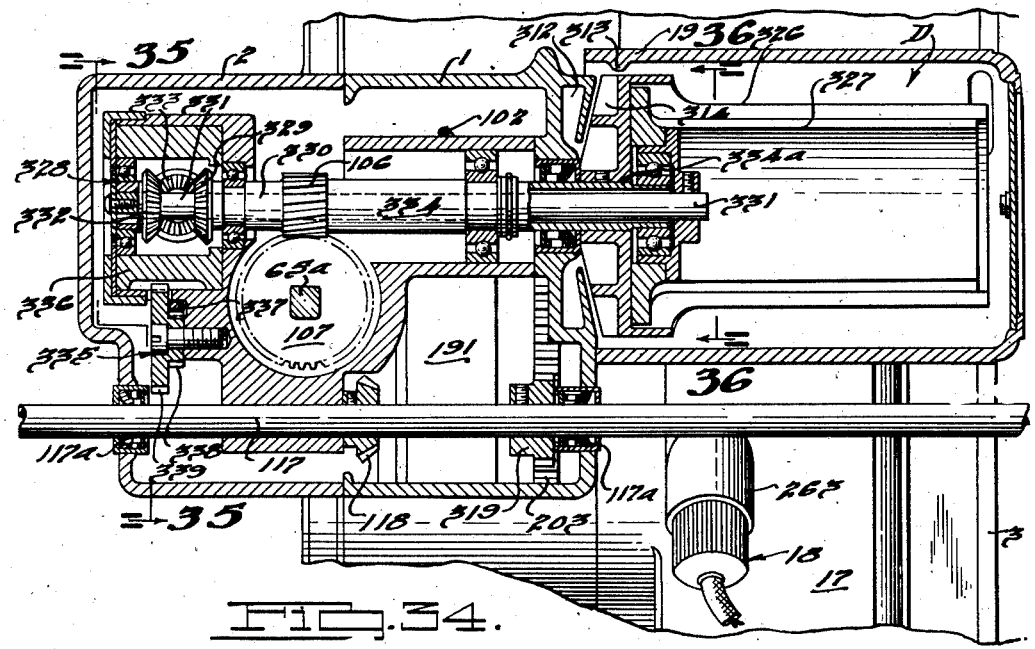

Fig. 34 is a section similar to Fig. 32 but showing a modified form of the light shutter mechanism embodying the present invention.

Figure 35:
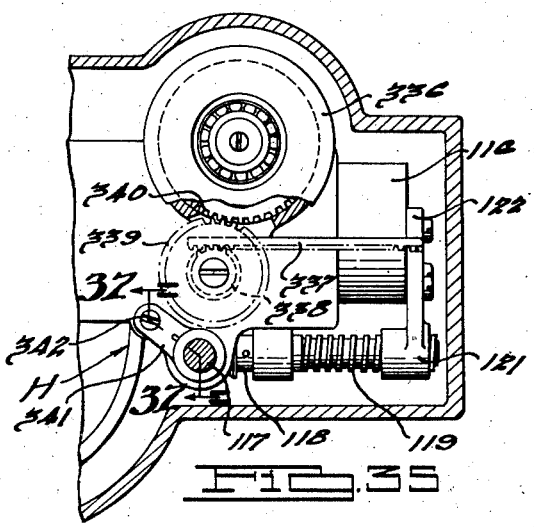

Fig. 35 is a fragmentary section taken substantially on the staggered section line 35—35 of Fig. 34 in the direction of the arrows and showing a cross section through the non-operating side cover showing the differential compensating device for driving the double shutter.

Figure 36:
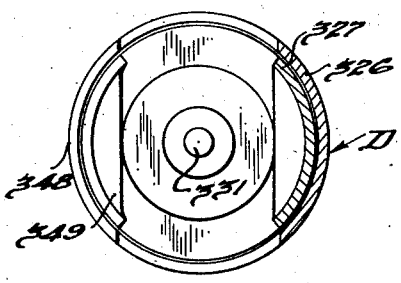

Fig. 36 is a section taken substantially on the section line 36—36 of Fig. 34 in the direction of the arrows showing a cross section through the shutter blades and the counterbalance and backing plates of each shutter blade.

Figure 37:
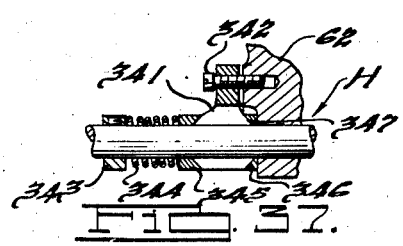

Fig. 37 is a fragmentary section taken substantially on the staggered section line 37—37 of Fig. 35 in the direction of the arrows and showing a cross section through the split locking arm on the framing shaft.

Figure 38:
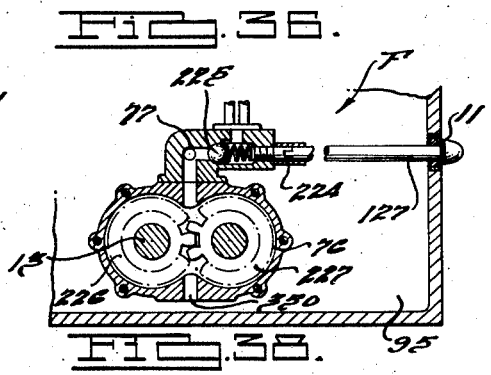

Fig. 38 is a fragmentary section taken substantially on the staggered section line 38—38 of Fig. 4 and showing a cross section through the oil pump and check valve.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A motion picture projector head embodying the present invention comprises a plurality of separate but interconnected assemblies and sub-assemblies of mechanical movements, each of which performs its intended function at a given time in the entire combination comprising the projector head of the present invention.

The description of the projector head shown in the accompanying drawings will proceed by reference insofar as possible to the component assemblies and sub-assemblies of elements which are designated generally in the several views by letters as follows:

A.—Magazine adapter containing fire valve rollers and removable clean-out tray.

B.—Lens, lens carrier and lens adjusting members.

C.—Film-feeding sprocket and guide roller assemblies.

D.—Light shutter including the driving and timing mechanism therefor.

E.—Intermittence movement including intermittence sprocket, Geneva movement and driving connections.

F.—Fire shutter and hydraulic control mechanism therefor.

G.—Cooling and ventilating system.

H.—Aperture pressure plate assembly and the locking and framing mechanism.

The elements of the foregoing assemblies and sub-assemblies will be first described as parts of the combination constituting the novel projector head of the present invention and thereafter their particular features of construction and operation will be separately described.

*General description of parts*

Referring to Figs. 1 and 2, the external parts of the motion picture projector head embodying the present invention comprise a casing 1 having a removable side plate 2 constituting the non-operating side of the head and a hinged access door 3 on the opposite or operating side of the head. The film magazine 4 shown in dotted line is placed on the magazine adapter 5 which has a removable clean-out tray 6 containing the rollers for the fire valve (to be hereinafter described). The upper film magazine (not shown) is mounted on the mounting 7 provided therefor on the top of the housing 1. The lens tube 8 is shown in the retracted position in the solid line and in the withdrawal position in the dotted line. The lens control knob 9 for actuating the lens carrier and focusing the lenses is placed beneath the lens tube 8 and is maintained in adjusted position by the lens control knob locking ring 10. The fire trap control knob 11 extends through the outer face of the casing 1 at a point adjacent the lens control knob 9. An oil drain plug 12 may be removed from the face of the casing to provide drainage of the oil from the oil sump contained therein. The main drive shaft 13 extends through the housing 1 and is connected with the sound head (not shown) for transmitting driving power to the interior mechanism of the projector head of the present invention. The shaft 13 is surrounded by an oil seal 14 which prevents leakage of the oil from the interior of the casing 1.

A plurality of framing control knobs 15 placed one on each side of the housing permits control of the framing of the images in the projection head. Oil is introduced to the inside of the casing 1 through the oil filler cap 16 having a filter for filtering the oil supplied to the interior of the casing. The rear aperture plate 17 (Fig. 2) is secured to the main housing 1. The electrical inlet 18 for the framing light is also shown in Fig. 2. The shutter housing 19 and one of the shutter blades 20 are also shown in Fig. 2. A handle 21 is provided for opening and closing the access door 3.

Referring to Fig. 3, the details of the interior mechanism of the projection head of the present invention are there shown. As there shown, an observation port 22 is provided in the shutter housing in order to permit the operator to determine the position of the shutter in the housing prior to threading the machine. A focusing spot 23 covered with semi-opaque glass is provided for observing the focusing of the projection light on the aperture plate. The rear aperture plate 17 is provided with a convex clearance 24 to permit the passage of the film therethrough after it leaves the intermittence drive sprocket. The oil level in the sump is shown through the oil level observation glass 25.

The removable lens adapter 26 is provided on the outside of the machine and cooperates with the other portions of the lens carrier as will be hereinafter described. The fire trap 27 is integral with the rear aperture plate and contains the fire shutter, the framing light and the switch. The movable aperture pressure plate housing 28 contains the movable aperture plate which retains the relative position of the film shoes and the spring tension plate and adjustment cams for the same, as will be hereinafter more fully described.

An electrical switch, indicated generally by the numeral 29, is provided for operating the framing light and is actuated by the opening and closing of the door 3. A manually operated push button, indicated generally by the numeral 30, is provided for manually raising the fire shutter hereinafter more fully described.

A control knob, indicated generally at 31, permits removal of the framing light as will also be hereinafter more fully described. A control knob 32 is provided for controlling the lock and permitting the removal of the movable aperture pressure plate housing. Tension on the film shoe springs (not shown) is provided by the control knobs 33.

A plurality of guide bars 34 are secured to a bracket 35 and are mounted on the housing 1 and provide support for the lens carrier and the movable aperture pressure plate housing in response to movement of the focusing knob 9.

An operating lever 36 is provided for moving and locking the movable aperture pressure plate housing. The lens carrier focusing screw, indicated generally at 37, contacts with the lens carrying bracket and causes its movement in response to movement of the focusing knob 9. The intermittence movement is contained in a housing 38.

An oil seal cap, indicated generally at 39, is provided on the end of the double bearing arm of the intermittence sprocket (not shown in this view). A film tension shoe 40 is provided on the intermittence sprocket and acts to hold the film at a given tension in contact with said intermittence sprocket. A door catch 41 is provided for holding the access door 3 in the locked position.

Film is fed through the projection head of the present invention through upper and lower feeding sprockets and guide rollers which comprise the feed sprockets 42 and 43, the sprocket guide rollers 44, 45 and 45a associated respectively with the feed sprockets 42 and 43 and carried respectively by the arms and actuating levers 46 and 47. The guide rollers 44, 45 and 45a are adjustably mounted on eccentric shafts, as hereinafter described, and are maintained in adjustment by the adjustment locking screws 86 and 87. The opening and closing contact of the guide rollers 44, 45 and 45a with the sprockets 42 and 43 is controlled by the guide roller operating handles 88 and 89.

Retaining caps 48 and 49 are provided on the arms 46 and 47, respectively, and are provided with springs (not here shown but hereinafter shown and described) for applying tension through said arms to the guide rollers 44 and 45. Stripper plates 50 and 51 are associated with the sprockets 42 and 43 and prevent jamming of the sprockets in the event of film breakage and are adjusted by adjusting screws 84 and 85 (Fig. 4). In threading the machine, the guide rollers 44, 45 and 45a are moved away from the sprockets 42 and 43 and provide a clearance to permit the sprocket holes on the film to be readily placed in alignment over the driving extensions on the sprockets 42 and 43.

Lubrication of the guide rollers is accomplished from inside of each guide roller through oil holes 52 and 53 which are closed with a resiliently held ball seal. The upper guide rollers in the fire trap, as will be hereinafter more fully described, are similarly lubricated through resiliently held ball seals 53.

Movement of the aperture plate housing 28 to permit threading of the machine is permitted by movement of the telescoping ring 54 of the lens assembly which is adjacent the lens carrier 55 which contains a taper 56 and a bayonet attachment 57 which permits removing the lens adapter 26 as a unit from the lens tube (see Figs. 28 to 31).

A rubber sealing ring 58 is provided around the lens adapter and serves to prevent air from being drawn into the projector head around the lens holder. The gear train carrier, to be hereinafter more fully described, is removable as a unit from the projector head by removal of the gear train removing screws 59 and 60. The intermittence mechanism is removable as a unit from the housing by removal of the intermittence housing retaining screws 61.

Other parts of the projector head of the present invention, as will be more fully described hereinafter in connection with the respective sections to which they are related, comprise the lens bracket 35 which is secured to the main housing by a plurality of screws 90, which carries the plurality of guide bars 34 which are secured to the bracket 35 by a plurality of screws 91. The aperture pressure plate housing 28 is moved by the actuating cam and roller 92 which is operated by the actuating lever 36. The actuating shaft connected with the lever 13 is journalled in a bearing 93 on the bracket and is controlled by a collar 94 which controls the arc of movement of the actuating lever and cam.

Oil is supplied to the interior of the housing and is maintained in the oil sump 95 which is separated from the remainder of the housing by the interior wall 96. The oil is drawn from the sump by the pump 76 and distributed to the various parts of the mechanism. As shown in Fig. 5, the oil filler cap 16 is provided with a filter member 97 which filters all oil flowing into the sump. The assembly of these parts is shown in Fig. 6 and as there shown, they comprise the wall 98 of the capsule which is secured to the casing 1, and the filter member 97 which is secured to the wall 98 by the stud 99. The oil line 101 supplies oil from the pump 76 to the intermittence movement, and an oil line 102 supplies oil from the pump 76 to the shutter drive mechanism.

As shown in Fig. 5, the vertical shaft 63 is journalled as at 100 on suitable bearings, such for example as ball bearings. The intermittence movement is driven from the shaft 65 by gears 103 and 104. The shutter D is driven from the shaft 105, having a drive gear 106 meshing with the spline gear 107 which is carried on and driven by the horizontal shaft 65. The horizontal shaft 65 is journalled in bearings 108 and 109. The shaft 65a connected with and driven by the shaft 65 is mounted on bearings 110 and 111 located on the ends thereof. The bearings 110 and 111 provide an anti-friction mounting for the spline gear 107 and are adjusted by the adjustment nut 112 on the bearing 110 which is locked in the adjusted position by the spring locking ring 113. The horizontal shaft 65 is definitely located by a shoulder 114 which is cast integrally in the housing and which acts as an aligning stop for the bearing 108.

The compensation slide housing 116 is actuated by movement of the framing shaft 117 which is actuated by the framing control knobs 15 connected therewith. The shaft 117 is connected with the compensator slide member by the beveled gear 118 and a lead screw 119 journalled in the bearing 120 and having a nut 121 engaging the threads of the lead screw. The nut 121 is operatively connected with an arm 122 which is secured to the compensator slide housing 116. This construction is shown in detail in Fig. 7.

As shown in Fig. 7, the end of the shaft 65a is journalled in ball bearings 111 which are seated on a shoulder 124 formed in the compensating slide housing 116 and which in cooperation with the bearings 110 and 111 keep the spline gear 107 in position.

Bosses 125 and 126 are provided to receive the screw-threaded connections with the sound head (not shown). The fire trap control valve knob 11 is connected with the shaft 127 which connects the knob 11 with the check valve (Fig. 38).

Gear train and gear train carrier

As shown in Fig. 4, the driving gears and drive shafts of the projector head embodying the present invention are carried on a gear train carrier 62 which carries and supports all of the gears, shafts and bearings of the entire drive mechanism and thus insures a predetermined and fixed accurate alignment of the parts. The entire gear train carrier is removable as a unit from the projector head by removal of the screws 59 and 60. The gear train and shafts carried by the carrier 62 comprise the vertical shaft 63 which is driven from the main drive shaft 13 by a set of main drive gears 64 which are driven by the shaft 13 and which transmit a driving force to the shaft 63. The vetrical shaft 63 drives the horizontal shaft 65 through gears 66 and 67. The horizontal shaft 65 drives the intermittence movement and shutter and has a splined section 65a (Fig. 5).

The upper and lower drive sprockets 42 and 43 are driven by upper and lower sprocket drive shafts 68 and 69 which in turn are driven from the vertical shaft 63 by gears 70 connecting the shaft 63 and the shaft 68, and gears 71 connecting the shaft 63 and the shaft 69. The end of the shaft 68 is journalled in ball bearings 72 and the ends of the shaft 69 are journalled in ball bearings 73. The main shaft 13 is journalled in ball bearings 74 and 75.

The gear train carrier 62 is located in the housing by holes in bosses 80 and 81 which register with dowel pins 82 and 83 in the casing.

Lubrication of operating parts

The various operating mechanisms are lubricated and the fire shutter is operated hydraulically by oil which is circulated under pressure by the oil pump 76 which pumps oil from the sump 95 through the oil feed line 77 which leads to the fire shutter operating cylinder. Oil is also supplied to the oil line 78 which supplies oil to the top of the gear train. The flow of oil through the line 77 is controlled by the check valve 79 which can be adjusted to create predetermined pressures in the hydraulic cylinder for operating the fire shutter (see Fig. 38).

Magazine adapter, fire rollers and clean-out tray

In Fig. 8 is shown the magazine adapter 5 with the removable tray 6 shown in the closed position in the solid line view and in the removed position in the dotted line view. As here shown, the tray 6 slides on the guide rods 128 and contains the large fire valve roller 129 and a plurality of smaller rollers 130, the top one of which only is shown in this view. The tray 6 is held in the closed position by the ball and spring locking connections 131 (Fig. 10) which engage the grooves 131a in the rods 128. The locking connections 131 are secured in bosses 132 carried by the tray. The magazine adapter 5 is removably secured to the casing 1 by a plurality of screws 133.

Further details of construction of the magazine adapter 5 are shown in Figs. 9 to 12, inclusive. As there shown, the rollers 129 and 130 revolve each on a separate shaft 134. As shown in Fig. 9, the film passes from the magazine adapter 5 to the interior of the casing and through the upper feed sprocket through the film slot 135. As shown in Figs. 11 and 12, the rollers 129 and 130 revolve freely each about a separate shaft 134. The outer surfaces of the rollers 130 are spaced slightly from each other and spaced slightly from the surface of the roller 129.

Each of the shafts 134 is held in place by male screw-threaded members 136 at one end and female screw-threaded members 137 at the other end, each of which is provided with an oil duct 138 communicating with an oil duct 139 in each shaft 134. The rollers 129 and 130 are spaced on the shafts 134 by spacing collars 140. The fire tray 6 during operation of the projector is contained in the magazine adapter 5. During the process of running the film, the film dust, chips, etc. are collected in the tray 6. In conventional construction the tray is not removable and is cleaned only with great difficulty. The accumulated particles in the fire trap are frequently the cause of film fires in the projector head.

In the projector head of the present invention, the fire rollers 129 and 130 contained in the original frame 6 slide into the magazine adapter 5 on the guide rods 128 and thus permit a ready removal of the fire trap and a cleaning of the fire trap outside of the projector head.

In the normal position the tray is held in the magazine adapter by the spring-pressed balls 131 which engage the grooves 131a on the guide rods and hold the tray against accidental removal. The tray for cleaning purposes is caused to slide forward on the guide rods. It will be seen that in so doing it is not necessary to disturb any other parts of the projector or to remove the upper magazine.

The oiling system for the rollers in the valve, as previously described, oils the rollers from the inside of the shaft so that oil must pass the entire length of the rollers before it can be thrown off. At this point the rollers extend beyond both edges of the film so that the oil does not contact the film surface. The oiling is accomplished by the provision of the oil inlet hole 138 which passes through the female screw plugs 137 and are aligned with the oil hole 139 in the center of each shaft 134. On the other end of the shaft is a recess in which fit the male screw plugs 136. The combination of the male plugs and the female plugs holds the shaft rigid so that the roller alone revolves. The male and female plugs hold the shaft and also permit lateral adjustment thereof, which in turn controls the lateral adjustment of the rollers.

On each male plug is placed a small collar 140 which rides freely on the plug between the frame and the roller and serves to keep the roller in a predetermined position.

*Aperture pressure plate carrier and lens focusing adjustment*

The aperture pressure plate and lens focusing carrier are shown in enlarged views in Figs. 13 and 14. As there shown, the bracket 35 carries a plurality of parallel rods 34 which act as guide bars for guiding movement of the lens carrier and the movable aperture pressure plate housing and is secured to the housing 1 by a plurality of screws 90. The plurality of parallel rods 34 are secured to the bracket 35 by a plurality of screws 91. The aperture pressure plate is carried on the aperture pressure plate carrier 141, which has bearing surfaces 142 engaging the topmost rod 34, and bearing surfaces 143 which engage the middle rod 34. Thus the aperture pressure plate carrier is supported in two planes in a rigid manner and is permitted to move in a plane parallel to the axis of the rods 34 and is guided in such movement by the bearing surfaces maintained in contact with the surfaces of the rods 34.

The lens carrier 55 is provided with bearings 144 contacting the middle rod 34 and a plurality of bearings 145 which contact the lower rod 34. By this construction the lens carrier is supported in two planes by the rods 34 and is permitted to move in a plane parallel to the axis of said rods.

The focusing of the lens is accomplished by movement of the lens carrier 55 in a plane parallel to the rods 34. This is achieved by movement of the lens-focusing knob 9 which is connected with the lens-adjusting screw 37 which is connected with an adjusting nut 147 which in turn is carried by the carrier 55 and is movable on the screw 37. To secure accurate adjustment and eliminate backlash between the threads on the screw 37 and the nut 147, there is provided a spring 148 which applies tension to the focusing nut 147 causing its threads to contact with but one side of the threads on the adjusting screw 37, thus giving in effect a micrometer adjustment. The screw 37 is journalled in a bearing 149 secured in the main casing 1 which also acts as a retainer for the locking ring 10 which bears on the split ring 150 to hold the adjustment of the screw 37.

In focusing the lens, the focusing knob 9 is turned, which causes the focusing screw 37 to revolve. After the desired focus is obtained, the lens-focusing locking nut 10 is turned. On the inside of the nut 10 and the retainer is a female taper which engages with the male taper on the split ring 150. Thus, as the nut 10 is turned inwardly, the surfaces come together, causing the ring 150 to constrict about the screw 37, thus locking the screw 37 in the desired position. In this manner, the focus of the lens can be locked and because of the lens holder embodying the present invention, the lenses may be removed and replaced without disturbing their focal plane in relation to the carrier.

The movement of the aperture plate bracket 141 is accomplished by movement of the actuating cam 92, which opens, closes and locks the aperture pressure plate carrier, depending on its position relative thereto. The cam 92 is moved by movement of the actuating shaft 151 which is operatively connected with the actuating lever 36. The cam arm 92 carries a pin 152 which carries a roller 153 (Fig. 4), which moves in an actuating slot 154 provided in the aperture pressure plate carrier 141. The aperture pressure plate carrier is maintained in adjusted position against the tension of a spring 155.

The operation of the aperture pressure plate carrier is as follows: When the actuation lever 36 is turned in a clockwise direction, it causes the cam arm 92 to revolve likewise. The roller 153 on the pin 152 of the cam arm 92 moves upwardly in the slot 154 of the aperture pressure plate carrier 141 and causes it to move forward, thus opening the aperture pressure plate to give access for threading film into the machine. When the film is placed in the machine, the actuating lever 36 is rotated in a counterclockwise direction, causing the roller 153 to move downwardly through the slot 154, closing the aperture pressure plate. As the roller 153 passes dead center in the slot 154 and is moved to a predetermined position as permitted by the locking collar 94 on the actuating shaft (see Fig. 4), the aperture pressure plate is locked in the closed position. The stop on the bushing 93 controls the amount of actuation of the aperture pressure plate, as above described. The spring 155 applies pressure on the actuating arm and the slot and this is transmitted through the roller to the stop on the collar. Thus, the aperture pressure plate cannot be forced open by a patch or other obstruction on the film as it passes through the machine, since the pin 152 and the roller 153 are maintained at a point below dead center of the slot 154.

The foregoing described construction is shown in larger scale in Fig. 14, in which the dotted line view shows the parts in position when the aperture carrier plate is open. The solid lines show the parts in the locked position. The stop 94a bearing on the slot 93a is here clearly shown. Adjustment of the aperture pressure plate is maintained by an adjustable locking device which is shown in this view and which is also shown in Fig. 26. The arrangement of the parts is such as to permit ready removal of the aperture pressure plate as a unit from the projector head.

As shown in these views, the aperture pressure plate is secured to the carrier 141 by a male cone 156 carried by a portion of the housing. The aperture pressure plate is located relative to the carrier 141 by a locating pin 157 which is carried on the plate 158. The plate 158 is adjustable in order to adjust the position of the cone 156 and the pin 157 relative to the carrier 141. The aperture pressure plate is removably locked on the cone 156 through a locking slot 159.

Referring to Fig. 26, it will be seen that the aperture pressure plate housing 160 is provided with a female cone member 161, which mates with the male cone 156 and with a boss 162 having an opening 163 which is adapted to register with the pin 157. The housing 160 is locked and unlocked in position on the cone 156 by a locking key 164 which extends inside the cone 156 and through the slot 159 and engages the inside surface of the cone 156. The locking key 164 is moved by the locking shaft 165, which in turn is moved by the actuating knob 166 and is maintained in locking position by tension of the spring 167.

Frequent removal of the aperture pressure plate housing 160 is desirable in order to permit cleaning of the pressure plate and housing and in order to permit cleaning of the film tracks. The removal of the aperture pressure plate and the housing as a unit is accomplished by turning the lock 164 from the vertical position to a horizontal position so that it is aligned with the hole 159. In this position the lock 164 can be withdrawn and the entire housing 169 may then be removed from the tapered cone 156.

In replacing the aperture pressure plate, the guide pin 157, which is fastened on the adjustment plate 158, enters a hole 163 in the boss 162 which gives primary alignment. The complete alignment is by contact of the parallel plane surfaces of the border of the aperture housing 160 coming in contact with the face of the fire trap 27. This achieves the alignment of the entire housing in a vertical plane. The housing 160 is pressed firmly back until the female cone 161 contacts the male cone 156. The knob 166 which actuates the lock is then pressed inwardly toward the cones and against the tension of the spring 167 until the lock 164 occupies a position inside the male cone 156. The knob is then rotated 90° and the lock fits into shallow grooves 159a (Fig. 13). After passing through the grooves 159a, the knob 166 is released and the lock engages the inner surface of the male cone 156, thus holding the parts securely in the assembled position.

*Aperture plate and film shoe adjustment mechanism*

The details of the aperture plate and film shoe construction are indicated generally by the letter H and are shown particularly in Figs. 25, 26 and 27. As here shown, the aperture plate 274 is secured to the fire trap housing 160 by a plurality of screws 274a and is provided with a masking plate 275 and an alignment pressure aperture plate 276. These parts are all carried by the movable aperture plate housing 28 which is removably held in place in the fire trap 160 by a plurality of removable screws 274a. The alignment pressure aperture plate 276 carries a plurality of shoes 279 which ride on the film to hold it against the film track. Spring pressure is applied to the shoes 279 by a plurality of duplex springs 280 which are carried by an adjustable spring plate 281 which is removably secured in place by a plurality of screws 282.

The adjustable spring plate 281 is aligned with and secured to the aligned pressure aperture plate 276 by a plurality of aligning screws 283. Tension on the springs 280 is controlled by a plurality of adjustable tension cams 284 which bear each on an equalizing vane 285 carried by the adjustable spring plate 281. The adjustable tension cams 284 are held in place by the spring locking members 286.

The aperture plate 274, the masking plate 275, and the spring plate 281 are provided with apertures which are aligned to form the aligned aperture 287 which registers with the open apex of the light cone 288 which leads to the aperture plate 274 through the fire trap housing 160. The open end of the cone 288 is closed by the fire shutter 233, as previously described, when the machine is not in operation. As shown in this view, the fire shutter is preferably constructed of spaced plates 289 and 290.

*Ventilation of aperture plate and adjustment of spring shoe tension on the film*

The flow of ventilating air currents through the aperture plate 274 is directed by a plurality of air deflecting members 291. Spring tension on the film shoes 279 is controlled by cams 284 mounted on movable shafts located one at the top and one at the bottom of the aperture housing 160 (Fig. 36). Each of these cams acts independently of each other and each has individual adjustment knobs 284a extending outside of the operating side of the aperture housing 160. The adjustment of the cams by the knob is held in place by the serrated collars 286a, each of which is in contact with the V-lip of a tension spring 286 which engages the serrations in the collars 286a. This retains the adjustable position of the cam 284 after the desired tension has been set. The adjustment cams ride on vertical vanes 285 mounted on the adjustable spring plate 281. This allows the adjustable spring plate 281 to rock upon the guide screws for equalizing spring tension on each side of the film. With this arrangement of the spaced cams 284, the operator may apply different tension at the top and bottom of the pressure shoes 279. In this manner it has been found that a desirable operation results from the use of lower pressures on the top film shoes with a steady increase in the pressure toward the higher pressures which are applied to the bottom spring shoes. In this way the film is guided with less side sway than where the tension on all of the spring shoes is equal.

The foregoing construction and assembly of the aperture pressure plate is shown more clearly in Fig. 27, where the parts are shown in an assembled position and may be removed as a unit from the housing 160. As will be seen, the members are removable and replaceable as an assembled unit from the housing 160, which is a desirable feature permitting a ready cleaning of the aperture and the aperture plates.

In Fig. 27 is also shown clearly the construction of the film tension shoe 40 which guides the film to the intermittence sprocket 209. As shown in Fig. 27 in perspective, and as shown in section in Fig. 26, the film tension shoe 40 comprises a sprocket shoe 292, which is so formed as to permit clearance of the film and the sprocket teeth. A tension spring 293 is mounted on a screw 294 secured to the alignment aperture pressure plate and is spaced therefrom by the spacing collar 295. The spring 293 exerts a tension on the sprocket shoe 292, which keeps the film at a desired tension and in contact with the teeth of the intermittence sprocket 209. As here shown also, the intermittence sprocket is provided with the stripper plate 209a to prevent jamming of the sprocket in the event of breakage of the film.

*Adjustment of aperture plate to eliminate "keystoning"*

By the construction here shown it will be seen that the aperture plate 274 may be tilted relative to its carrier by the adjustment of the screws 274a. In this manner the aperture plate 274 can be adjusted in such a manner as to lie in a plane which is substantially parallel to the plane of the projection screen. In this way the image projected through the aperture plate may be shown on the screen in such a way that the image as shown on the screen is in focus on all parts of the screen. This eliminates a defect present in conventional types of projection apparatus which is commonly referred to as "keystoning," as a result of which parts of the projected image appear on the screen in a distorted and unfocused condition. By adjusting the aperture plate as above described so that it lies in a plane substantially parallel to the plane of the screen, I have found that the defect of "keystoning" is substantially eliminated in the images projected through the projector head embodying the present invention.

*Film-feeding sprockets and guide roller assembly*

The film feeding sprocket and the guide roller assembly consists of upper and lower sprockets and guide rollers indicated generally by the letter C (Figs. 3 and 4). The details of the upper and lower assembly are substantially the same and will now be described with reference to the upper assembly only, it being understood that the same construction and method of operation are used in the lower assembly except that two guide rollers 45 and 45a are used with the sprocket wheel instead of the single guide roller to be hereinafter described.

The details here to be described are found in Figs. 15, 17 and 18, which show, respectively, a fragmentary cross section through the projector head substantially at the center line of the upper feed sprocket, and details of the sprocket and guide roller assemblies. As here shown, the sprocket 42 is secured to a stub shaft 168, which is connected in driving relation with the sprocket drive shaft 68. An oil seal 169 is provided around the shaft 168 to prevent leakage of oil from the interior of the machine. The drive shaft 68 is journalled on its ends in ball bearings 170 and 171 and is driven from the vertical shaft 63 through the drive gears 70. The stripper plate 50 (Fig. 4) is supported on the stripper plate bracket 172. The guide roller 44 is mounted for rotation on an adjustable eccentrically mounted shaft 173, which has an eccentric connection with the carrier arm 46. The arm 46 rests in the closed position on the boss surrounding the sprocket shaft.

To obtain clearance and adjustment between the guide roller 44 and the sprocket 42, the guide roller shaft 173 is provided with a screwdriver slot on the outer end (not shown), by means of which the shafts may be rotated to secure the desired adjustment of the rollers. The eccentric connection with the bracket at the other end of the shaft increases or decreases the distance between the roller 44 and the sprocket 42. After the desired adjustment has been obtained, the set screw 86 secures the shaft 173 and the roller 44 in the adjusted positions. It will be seen that the adjustability of the guide rollers is particularly important in the lower sprocket assembly as the two guide rollers 45 and 45a must be aligned in relation to the sprocket 43.

In the machines of the prior art the guide rollers 45 and 45a cannot be adjusted independently of each other since it is conventional practice to secure the rollers directly to the arm and to permit only an adjustment of the entire arm without the separate adjustment of the separate rollers.

The guide roller 44 is lubricated from inside the shaft 173 by an oil duct 174 which communicates with a spring-pressed ball sealing member 52. From the ball valve oil sealing member 52, an oil hole 174 extends through the axis of the guide roller shaft 173 to a point midway between the extremities of the rollers. From there it leads to the surface of the shaft. Thus, when oil is applied, the bearing is oiled the entire length of the roller and any excess oil which escapes at the end of the bearing is caught by the extending rim 175 of each roller and is thrown off the roller by centrifugal force due to its rotation outside the path of the film. Thus, no oil gets on the surface of the film.

Each guide roller is maintained on the shaft by a split ring 176 which rests in a groove on the end of each shaft 173. The lever 88 and the bracket 46 are pivotally mounted on the stud 177 and are maintained in position by a spring 178.

In threading up the machine, it is necessary to raise the guide rollers 44 off the sprocket 42. After the film is pressed on the sprocket 42, the roller 44 is closed down to hold the film in contact with the sprocket. The roller 44 must be held under tension so that the film cannot lift it out of position. This tension is provided by the flat spring 178 secured to the arm in the recess as shown in Fig. 18. The end of the spring 178 rides on a round shaft-like cam 179 having a flat spot 180 which gives purchase to the spring when the roller 44 is closed on the sprocket 42. Tension is adjustable by varying the position of the flat spot 180 in relation to the sprocket 42. After adjustment has been made, the cam 179 is locked securely to the main casing by means of the screw stud 177.

The arm has a bearing 181 on each end of the journal which rides on the round portion of the cam 179. The removal of the arm from the machine is effected by removal of the cap 48 and rotating the spring 178 off the flat spot 181 and drawing the same forward without disturbing the setting of the cam 179. The cap 48 screws on to the head of the cam stud 177. The actuating lever 88 by which the guide roller 44 is opened and closed, is such that no strain is placed on the roller shaft when the roller is raised and lowered. This keeps the roller in the desired alignment with the sprocket during the life of the machine. As shown, the spring 178 is secured to the arm casting 146 by a screw 182 which may be inserted and removed through the hole 183.

Intermittence movement

The intermittence movement is indicated generally by the letter E in the several views and is shown in detail in Figs. 16, 19, 20 and 24, to which reference will now be made.

As shown in these views, the intermittence movement is mounted as a unit in the intermittence movement casing 38 and may be removed as a unit and without disturbing its synchronized adjustment with the other parts of the device, by removal of the casing 38 from the machine. The intermittence movement comprises the intermittent drive shaft 184 which is journalled in ball bearings 185 and 186 on opposite ends of the shaft and is spaced by collars 187 and 188. The shaft 184 is connected with a flywheel shaft 189 by a splined connection 190. The flywheel 191 is connected with the shaft 189 and is driven thereby and in turn drives a gear 192 which meshes with the gear 193 and the cam shaft 194. The flywheel shaft 189 is journalled in a bushing 195 and the cam shaft 194 is journalled in a bushing 196.

Oil is admitted to the intermittence movement from the pump 76 by the oil supply tube 101 which discharges oil into the oil inlet 197. Oil flows through the intermittence movement and out of the intermittence movement housing through the oil outlet 198. The casing 38 comprises a front wall 199 and a back wall 200. The intermittence movement is held in place by the threaded ring 201 (Fig. 24), which holds the intermittence retaining ring 202 in connection with the main casing and in adjustment relative thereto.

The adjusting ring 201 is held in an adjusted position by means of a spring washer 201a which acts substantially as a pressure washer in the assembly. This is shown in section in Fig. 16.

Leakage of oil from the intermittence movement to the case of the machine is prevented by the oil seal ring 202a which is placed between the member 202 and the adjacent flange of the main casing.

Around the periphery of the ring 202 is provided a segment of spur teeth 203 (Fig. 24), which engages with the framing gear. An eccentric adjustment ring 204 is provided to assist in the adjustment of the intermittence movement, as will be hereinafter described.

The Geneva movement forming a part of the intermittence movement consists of a pin and cam 205 and a star gear 206 (Fig. 21), which is mounted on a star shaft 207 which is journalled in the bushing 208 and drives the intermittence sprocket 209 which is locked by the pins 210 onto the shaft 207. The end play adjustment of the shaft 207 is provided by laminated shims 211. Lubrication of the bearings is accomplished through the ball oil seal 212. The entire intermittence movement and the housing is maintained in place by a plurality of removable screws 213. The segment ring 201 is provided with a slot which is constricted by the screw 214.

When it is necessary to remove the intermittence movement from the machine, the screws 213 located symmetrically about the retaining ring 202 are loosened. The intermittence movement is then rotated counterclockwise so that the ends of the retaining screw come into position over the clearance slots 215 (Fig. 20). The entire intermittence movement may then be pulled from the case without disturbing any of the gears or other moving parts thereof. The disengagement is permitted by means of the spline connection 190 on the rear of the flywheel 191. In replacing this movement or in substituting another movement for the particular intermittence movement in the machine, the spline connection 190 on the flywheel 191 is so designed that it can only engage the spline on the intermittent drive shaft on the gear train carrier in one position through 360° of movement. The movement of the intermittent sprocket 209 is thus synchronized with the shutter of the machine, whereas in prior projector heads, when the intermittence movement is removed as is frequently required for service and cleaning operations, it is necessary to move the gears out of mesh and when replacing the movement to resynchronize the movement and the shutter. This operation is eliminated by the use of the mechanism herein described.

The adjustment of the clearance between the star 206 and the cam 205 is accomplished by loosening the set screw 216, which at the same time loosens the eccentric collar 204 imposed between the double bearing support arm and the case of the intermittence movement. The adjustment is accomplished by moving the eccentric collar 204 without disturbing the double bearing support arm. This is a desirable feature since the star shaft tends to seat itself in the top segment of the double bearing after operation of the machine for some period of time. The seating in the top segment is caused by the continual pulling down of the film by the intermittent sprocket. This is a feature which is different from conventional types of projector heads in which the double bearing arm is swung radially and this brings a new surface of the bearing into use and causes interference in the smoothness of the operation of the intermittent sprocket. After properly adjusting the star 206 in relation to the cam 205 through movement of the eccentric collar 204, the set screw 216 is tightened and locks the three units in operating relationship to each other.

The star shaft inner bearing 207 extends out through the double bearing support arm and rests against the inside end surfaces of the intermittent sprocket 209, thus providing a definite stop for the sprocket. On the outer end of the double bearing support arm is a journal 217 which carries the outer star shaft bearing 218. This journal is secured to the bracket by means of a plurality of screws 219. Imposed between the bracket and the inner end surfaces of the journal are laminated shim washers 211. The adjustment and taking up of the end play in the star shaft and intermittent sprocket is obtained by removing one shim at a time and adjusting the parts and testing the same for tightness of the intermittent sprocket 209. As soon as there is a drag on the sprocket after the removal of one shim, the shim is replaced and the sprocket will be found to have the proper clearance. A cap 220 seals dirt out of the end bearing and is provided with a ball oil seal 212 to permit lubrication of the sprocket and shaft.

The star and cam movement is shown in detail in Fig. 21 and comprises the star gear 206, which is secured to the star shaft 207. As shown, the periphery of the star gear 206 rides on the surface of the cam 205a on the cam 205 and is contacted by a pin 221 which is carried on the cam 205 and causes the star wheel 206 to move through 90° of movement for each complete revolution of the cam 205.

As shown in Fig. 24, a journal 222 is provided for the bearings 195 and 196, and in the embodiment here shown is cast integrally with the back plate.

In Fig. 19 is shown the construction and arrangement of the spline connection for driving the intermittence movement so that upon disconnection of the intermittence movement from its drive shaft, the shafts are permitted to mate in but one position in 360° of rotation. In this way removal of the intermittence movement is accomplished without changing its synchronization with the drive shaft.

Hydraulic control of fire shutter

The fire shutter and actuating mechanism is identified generally in the several views by the letter F. In the embodiment of the invention here shown, the fire shutter is raised automatically by hydraulic pressures which are exerted on the hydraulic cylinder 223 (Fig. 16). The hydraulic cylinder 223 is connected to the hydraulic line 77 which supplies oil under pressure from the pump 76. The control of pressure in the line 77 is accomplished by the adjustable check valve shown in Fig. 38. As there shown, the pressure adjusting knob 11 is connected with a shaft 224 which exerts a pressure on a spring-pressed ball check valve 225 which controls the flow of oil from the pump 76 through the oil duct 77. As shown in this view, the oil pump 76 is preferably of the gear type consisting of the meshed gears 226 and 227, although any other suitable type of oil pressure pump may be used.

As shown in Fig. 16, the shutter-operating cylinder 223 consists of a shell 228 in which is mounted a spring-pressed piston 229. A rod 230 is connected with the piston 229 and exerts a pressure on the pedal 231 for the fire trap rack. The spring-pressed piston 229 is raised in such a manner that it returns to the position as shown in Fig. 16 upon the release of the hydraulic pressures thereon. The piston 229 is maintained in the position for raising the fire shutter by a constant flow of oil under pressure through the duct 77, which oil is constantly returned through a plurality of ports 232 and vent ports 232a provided in the shell 228 of the cylinder. Thus, when the check valve 225 has been properly set, the flow of the oil from the pump is at such a rate that when the machine is up to operating speed, sufficient pressures are generated in the cylinder 223 to move the piston 229 and exert a pressure on the pedal 231 of the fire trap rack. This movement of the pedal 231 causes the fire shutter 233 to be moved to the open position as shown in Fig. 23.

The piston 229 moves in the cylinder 223 only to the point where the relief ports 232 and 232a are uncovered. At this point excess oil escapes through the relief ports 232 and 232a and the piston is maintained in the position for exerting a pressure on the pedal 231 for as long as the oil pressure is sufficient to supply the required amount of oil to the cylinder. If the oil pressure drops due to a slowing down of the machine, the action of the spring on the piston 229 restricts the piston and the pedal allows the curtain 233 to move to the closed position as shown in Fig. 22. Upon drop of the predetermined pressures on the hydraulic fluid, the piston is returned to the position shown in Fig. 16 and in returning to this position vents the hydraulic fluid through the ducts 232a as well as through the ducts 232. Thus the provision of the separate ducts 232a on the top of the cylinder and the ducts 232 on the bottom provides for the quick return of the piston and the quick release of the fire screen shutter.

Thus the ports 232 and 232a serve two purposes in the cylinder. First, they act as a relief outlet for oil in the line when the oil pressure falls off, thus allowing an immediate closing of the fire shutter by the action of the springs provided. If the springs fail, the shutter is so arranged, as shown in Fig. 22, that the fire shutter will close by gravity alone, in which event the oil in the cylinder is forced out of the cylinder by the movement of the piston. Second, the ports 232 at the lower portion of the cylinder act as drain holes for all oil that seeps past the piston. Various types of constructions may be employed to prevent seepage of the oil around the piston. In the construction here shown, the top of the piston is provided with a slightly concave portion 229a to provide a small rim around the circumference of the piston head and thus to reduce the contact surfaces between which the hydraulic fluid is held. The internal tension of such fluid between the head of the piston and the cylinder head otherwise causes the piston and the cylinder head to adhere to each other after the piston returns to its normal position. A button 234 is provided for the manual operation of the fire shutter.

A better understanding of the operation of the fire shutter 233 will be had from a consideration of Fig. 22 and 23. In Fig. 22 the parts are shown with the shutter in the closed position and in Fig. 23 the shutter is shown in the open position. As here shown, the pedal 231 is formed as the end of a rack gear 235 which has gear teeth which mesh with a rotating pinion gear 236. The pinion gear 236 is operatively connected with a shaft 237 to which the fire shutter 233 is attached. Movement of the rack 235 in response to movement of the shaft 230 by the hydraulically operated piston 229 is thus translated into rotary movement of the shaft 237, which causes the shutter to rotate with the shaft 237 and thus to be raised or lowered relative to the aperture 238. A spring 239 is connected with tre rack 235 and tends to hold the rack in such a position that the shutter 233 is normally maintained in its closed position with its edge in contact with the stop 260. Movement of the parts to bring the shutter to the raised position causes the spring 239 to be extended. Thus, when the hydraulic pressure drops, the shutter 233 tends to move to the closed position by the action of the spring 239, the spring connected with the piston 229, and by the weight of the shutter 233. Thus, in the event of an accidental showing down or stoppage of the machine, the drop in the hydraulic pressure in the line 77 permits the shutter 233 to immediately be closed over the port 238 and it thus shuts off light and heat from the projection light (not shown) and prevents burning of the film.

The shutter 233 may be manually operated by the button 234 which is connected with a rack 240 which also engages the gear 236 to cause rotation of the shaft 237. The rack 240 is normally held in the position shown in Fig. 22 by the spring 241 which bears upon the button 234 and holds the rack 240 in the restricted position there shown. If pressure is exerted on the button 234, it will be seen that the teeth of the rack 240 will be brought in contact with the teeth of the gear 236 and cause rotation of the gear 237 and a movement of the shutter 233 to the open position.

Referring to Figs. 22 and 23, it will be seen that the fire trap within the walls 242 and 243 is placed adjacent an intermediate wall 1a of the main housing and communicates with the manifold 244 through the air passage 245, which thus ventilates the interior of the fire trap by air flowing through the fire trap from the air ducts 259 which communicate with the outside of the projector case and lead air into the fire trap. Thus, directed air currents are brought in contact with the film and cool it as it passes through the fire trap. The film is guided through the fire trap by the outer guide roller 246 and the inner guide roller 247 which are mounted on a shaft 248 supported by bosses 249 and 250. The interior of the shaft 248 is drilled to provide an oil duct 251 which has ports 252 and 253 communicating with the inside surface of the guide rollers 246 and 247. Oil is supplied to the duct 251 through the spring-pressed ball cap 254. The outer guide roller 246 is located in the shaft by means of the collar 255 which is fixed thereto by the set screw 256. The inner guide roller 247 is held in place by tension of the spring 257. The aperture plate 17 is secured to the fire trap case by screw-threaded connection with the bosses 258.

Framing light and switch

Referring to Figs. 22 and 23, the framing light 261 is disposed adjacent the opening 238 and is held in the socket 262 which is electrically connected with the electrical inlet plug 18, which is secured to the outside of the boss 263. The inlet wire 264 is electrically connected with the socket 262 and with the switch 265 which controls the supply of electrical current to the socket 262 and to the lamp 261. The switch 265 is operated by the switch button 266.

As shown in Fig. 23, the hinged cover 3 of the casing 1 is provided with a plunger 267 which contacts the switch button 266 and breaks the connection of the switch 265 when the door is closed. When the door 3 is open, the button 266 assumes the position shown in Fig. 22 and establishes an electrical connection, causing the framing light 261 to become lighted.

This operation of the switch and framing light is very desirable as it automatically lights the interior of the projector when the access door is open and thus enables the operator to make the necessary adjustments as in framing.

The electrical inlet 18 may be of any desired type, the type here shown consisting of a male and female plug so that if it is desired to remove the projector head from the base of the machine, the electrical connection can be readily broken by operation of the plugs.

It will be seen that the framing light 261 is so placed in the fire trap that it is not necessary to raise the fire shutter 233 in order to have the light of the lamp available for framming the picture. Thus, both hands of the operator are free for threading the machine.

The socket 262 which holds the light 261 is preferably mounted in a plug 268 having a knurled knob 269 which extends beyond the surface of the fire trap housing. This assists in the removal of the framing light and the replacement of any burned-out bulb. Electrical contact is made between the socket 262 and the current flowing through the wire 264 by means of two metal rings 270 and 271 connected respectively to the ends of the wire 264 and contacting with contact springs 272 and 273 which are electrically connected with the contact points of the framing light 261.

Telescoping ring

In Fig. 25 is shown the details of the assembly of the telescoping ring 54 which is connected between the aperture housing 28 and the lens carrier 55. As here shown, the telescoping ring 54 telescopes inside the aperture housing 28 and inside the lens carrier 55 and is slidably mounted on a plurality of studs 296 which are secured to the aperture pressure plate housing 160 and slidably connected with the telescoping ring 54 by guide holes in a plurality of bosses 297 provided on the telescoping ring 54. Tension is applied on the telescoping ring 54 by a plurality of springs 298 which surround the studs 296 and bear on the aperture pressure plate housing 160 and on the bosses 297. The studs 296 are adjustably secured in the aperture pressure plate housing 160 by a plurality of set screws 299. The ring 54 closes the gap between the pressure plate housing 160 and the lens carrier 55 so that in the case of a film break, the film cannot be passed into the light beam and become ignited. At the same time, the ring 54 telescopes in the housing 160 during the threading operation. Also, the ring 54, being mounted on springs as above described, may be pressed into the recessed ring of the aperture pressure plate housing to permit removal of the aperture pressure plate housing from the machine.

Lens carrier and withdrawal tube

The lens carrier and withdrawal tube are shown in further detail in Figs. 28 to 31, inclusive. As there shown, the lens carrier 55 is adjustably secured to a sleeve 300 by set screws 301. The lens is held in the withdrawal tube 8 by split compression rings 302 and 303. If the lenses are of sufficient size, they are directly contacted by the compression rings 302 and 303. If, however, the lenses are smaller, they may be accommodated by a split integral adapter (not shown) which is constricted by the compression rings 302 and 303. The compression rings 302 and 303 are clamped by means of the screw collar 304 which bears upon female tapered solid rings 305 and 306. Thus, when the screw collar 304 is screwed further into the withdrawal tube 8, the rings 305 and 306 are forced into the tapered split rings 302 and 303, causing them to be constricted about the lens unit.

It is to be understood that any desired type of adapter may be used for holding in the assembly lenses of smaller diameter than are to contact the withdrawal tube without a lens adapter as here shown. One form of such adapter may be a cylindrical framework which is adapted to contact the outer periphery of the lens and to space such periphery of the lens from the inside of the withdrawal tube 304. Such an adapter is preferably split in such a manner that the adjustment of the tube 304 will clamp the adapter more tightly about the periphery of the lenses contained therein and thus lock the lenses and adapter in the withdrawal tube. Thus, movement of the withdrawal tube will be transmitted through the adapter to the lenses and will permit the use of lenses of various sizes. If, however, the outer periphery of the lens to be used is of such a diameter as to be held by the lens holding rings, it is not necessary to provide the adapter above described. It is to be understood also that the adapter may be of various forms.

The rubber ring 58 surrounds the withdrawal tube 8 and is placed in contact with it. The ring 58 serves to keep dirt out of the machine and away from the film and also acts as a thermal insulator to keep the heat from the lens assembly from being transmitted to the main case. The rubber ring 58 also shuts off convection air currents and drafts caused by the shutter and lamp and thus prevents the drawing of dirt into the projector, which is one of the principal causes for dirt on the front lens assembly.

The withdrawal tube 8 and indexing ring 308 facilitate the removal of the lens for cleaning and the ready replacement of the lens in the machine without changing the fixed focus of the lens in the carrier. This removal is accomplished by rotating the withdrawal tube 8 in a counterclockwise direction until the bayonet locking members 56 are in line with the respective clearance slots in the withdrawal tube. The entire assembly may then be drawn forward and out of the machine.

In replacing the assembly in the machine, the bayonet slots must match before the taper on the withdrawal tube 8 can be brought in contact with the female taper 56a in the lens carrier. When the tapers are connected together, the assembly is rotated clockwise until the pin 307 on the indexing ring stops the rotation. Thus, the corrected axis of the lens always is held in the predetermined position required for focusing the lens even though the lens may be removed from the carrier for cleaning.

The withdrawal tube 8 is held in its taper by the indexing ring 308, which is held under spring pressure by the spring 309. The indexing ring 308 is permitted to move laterally in the housing and to provide a spring lock for the bayonet locking members 56 of the withdrawal tube 8. The indexing ring 308 is held in position and restrained from revolving by the pin 310 in the housing which rides in a groove 310a.

Fig. 31 shows clearly the arrangement of the slots in the withdrawal tube 8, which permits it to enter the indexing ring 308 in but one position. The cross section view (Fig. 30) shows the method of retaining the indexing ring 308 in but one position in relation to the housing. This maintains a constant position for the pin 310 in the indexing ring so that the pin occupies a position in the groove 310a and thus assures a fixed predetermined relationship between the lens and the lens carrier.

*Light shutter and driving mechanism*

The light shutter and driving mechanism indicated generally by the letter D is shown in detail in Figs. 32 to 36, inclusive. In Fig. 32 is shown a section through the single blade shutter 20 which acts as a cutting blade and a compensating blade for reducing flicker. This view shows the cutting blade 20 of a width sufficient to blank off the light during movement of the film over the aperture. The blade is placed closer to the film than in conventional constructions and is therefore narrower than the usual blade.

In compensating for the flicker of the light, the blade 20 cuts the cone of light at a point relatively near the film. The compensating portion of the blade is narrower than the cutting portion of the blade and gives two different width characteristics to the same blade so that when the blade revolves 180°, the smaller portion of the blade cuts the light beam. This construction of the light shutter permits the passing of relatively more light to the film than is permitted by conventional constructions.

Ventilation of the shutter 20 is provided by ducts 311 on the shutter housing 19 which communicate with the air manifold 312. Air is deflected through the ducts 311 by the deflecting rib 313 which is cast integrally with the housing 19. Air is drawn through the housing 19 by the impeller 314 which is cast integrally with the shutter 20. The impeller 314 and the shutter 20 are mounted on a stub shaft 105a which is operatively connected with shutter driving shaft 105 and is secured in place by a set screw 315. The shaft 105 is supported by and journalled on its ends in ball bearings 316 and 317. An oil seal 318 surrounds the shaft 105a and prevents the leakage of oil around the shaft 105a.

Other features of the invention which are shown in Fig. 32 include the gear segment 203 on the collar 201 of the intermittence movement which meshes with the spur gear 319 which is secured to the framing shaft 117. As shown, oil seals 117a are provided around the shaft 117. As here shown and as shown also in Fig. 25, the opaque observation glass 23 is removably held in the end of the housing 19 by a plurality of spring clips 320.

In Fig. 33 are shown further details of the shutter blade and impeller assembly and mounting. As here shown the impeller 314 is provided with a plurality of fan blades 321. A counterbalance 322 is cast integrally with the impeller 314 and the shutter blade 20. As here shown and as also shown in Fig. 25, a heat shield 323 is spaced from and secured to the shutter housing 19 by a plurality of attaching screws 324 and a plurality of spacing collars 325.

*Double cylindrical light shutter*

In Fig. 34 is shown a double revolving shutter comprising the outer shutter 326 and the inner shutter 327, which is designed as a modified form of the present invention to be used in place of the single shutter blade 20 previously described. In this embodiment of the invention the double shutter arrangement is such that the inner shutter 327 is arranged concentrically within the outer shutter 326 and the shutters revolve in opposite directions. The driving of the shutters in opposite directions is accomplished by means of a differential driving mechanism identified generally by the number 328, which is driven by the main gear 329 which is secured to the shaft 330 which is driven by the gear 106 which meshes with the drive gear 107. The inner drive shaft 331 is connected with the inner shutter 327 and is driven by the gear 332 which in turn is driven by the gear 333 which is driven by the gear 329. Thus, the shaft 331 revolves in a direction opposite to the direction of the shaft 334. Secured to the shaft 334 is a stub shaft 334a, which is operatively connected with the outer shutter 326 and serves to drive the shutter. The gearing above described is selected in such a manner as to provide a definite gear ratio of 1 to 1, so that the shafts and the attached shutters 326 and 327 are revolving at the same speed.

The shutters 326 and 327 are provided with cut-away portions, as shown in Fig. 36, so that as they pass each other the light is alternately cut off and allowed to pass through the shutters. This gives the blades the characteristic of having two different widths. As a result, less light interruption is necessary to compensate for flicker than is needed for the movement of the film.

The relationship between the two shutters is maintained during framing of the machine by the compensating device, indicated generally by the numeral 335, which rotates the differential carrier 336 through the rack 337 (Fig. 35) and which drives the spur gear 338 which in turn drives the gear 339 which drives gears 340 on the differential gear housing 336.

As shown in Fig. 35, the rack 337 is secured to the arm 122 secured to the compensation slide housing 116 and moved by the nut 121 moved by the lead screw 119 upon actuation of the framing shaft 117. Thus, the blades are maintained at all times in synchronization during the operation of the framing shaft 117.

The construction of the double shutter shown in Fig. 34 is shown in cross section in Fig. 36. As there shown, the external shutter blade 326 is provided with a counterbalance 348 and the internal shutter 327 is provided with a counterbalance 349.

Framing adjustment lock

Shown in Fig. 35 and in more detail in Fig. 37 is the restraining arm on the framing shaft. As shown in Figs. 35 and 37, the framing shaft 117 is provided with a split constricting locking arm 341 which is provided with a screw 342 for holding the locking arm to the gear train carrier 62. Surrounding the shaft is a collar 343 and a spring 344 which bears upon the female tapered ring 345, which also surrounds the shaft 117. Another female tapered ring 346 is provided around the shaft 117. The arm 341 is provided with male tapered portions 347 which mate with the female tapered portions of the members 345 and 346. As will be seen from Fig. 37, the pressure of the spring 344 bears against the female tapered member 345, causing it to exert a pressure on the male tapered portion 347 of the arm 341 and thus operates to create a frictional resistance which tends to increase the friction holding the shaft 117 in position.

Oil pump

As shown in Fig. 38, the oil pump 76 preferably of the gear type having the meshing gears 226 and 227, is provided with an oil inlet 350 which draws oil from a point adjacent the bottom of the sump 95. The pump is driven from the main drive shaft 13. This arrangement of the pump 76 relative to the sump 95 assures the circulation of oil through the mechanism even though the oil level in the sump has been allowed to fall. If the oil level drops below safe limits, the pump 76 cannot draw oil from the sump 95 and thus is unable to build up a pressure which is sufficient to operate the fire shutter as previously described. This gives the operator warning that the oil level is low and, although the machine can still run, the fire shutter is in place and no light is projected from the machine. When the oil is replenished and the pressure is built up by the pump, the fire shutter is raised and permits the projection of light. This is an added safety feature which makes it impossible for the machine to be operated without warning the operator that the machine has an insufficient oil supply.

In general

From the foregoing description it will be apparent that a motion picture projector head embodying the present invention incorporates a number of novel and useful improvements in the construction and arrangement of the component assemblies and sub-assemblies which make up the complete projector head unit.

As above described, the fire trap is provided with the cleaning tray so that it is readily removable to permit cleaning of the trap without removing the film magazine. The sprocket roller arms in the fire trap are all enclosed and are lubricated in such a manner that oil is not thrown onto the film. As is known to projection machine operators, this provision of lubrication of the rollers so as to reduce the friction in the fire trap and the provision of the removable tray so as to permit ready cleaning of the fire trap will eliminate many fires and is, therefore, an important feature of the present invention.

The lens assembly as previously described provides a construction in which the complete assembly of the lenses can be removed for cleaning without requiring refocusing of the projector since the lens assembly is such that it always is replaced in the lens carrier in the proper position for the corrected axis of the lens. Thus, the lens carrier may be focused and this focusing adjustment will be maintained during removal of the lens carrier for cleaning or replacing of the lenses. This also permits the use of a universal lens adapter which may be used with lenses of different sizes and permits the accurate setting of the lenses in the carrier so as to provide a corrected axial setting of the lenses. The lenses are focused by the conical collar and tapered sleeve and may be removed and replaced through the use of the bayonet lock. The use of the rubber gasket seals the lens holder and prevents the inflow of the convection currents, thus reducing the dirt on the lens to a minimum. The rubber gasket acts to prevent the carrying away of heat from the lens assembly and thus permits a substantially uniform heat retention in the lens assembly so as to do away with chromatic aberration which may occur by variation of the retained heat in the lens.

In adjusting the lens by the lens adjusting knob, a screw-threaded adjustment is provided with a spring tension keeping the male and female screw threads in intimate contact with each other so as to prevent play and backlash during the adjustment. Thus, an adjustment similar to the adjustment on micrometers makes possible a very accurate movement of the lens during the focusing operation.

The guide rollers associated with the upper and lower sprockets are readily adjustable relative to the sprockets by means of the eccentric shafts which permit their accurate and ready adjustment both in regard to the carrier arm and in regard to the sprocket. Operators familiar with conventional machines will recognize that this is a distinction which is not found in conventional machines wherein the adjustment of the followers is limited to adjustment of the arms. As it is important to have the guide rollers in perfect adjustment with the sprockets, it will be seen that this feature of separate adjustability with the guide rollers is an important feature of the present invention.

Lubrication of the guide rollers from inside the shafts is also an important feature as it permits a complete lubrication of the guide rollers and yet prevents oil from coming in contact with the film as the excess oil is thrown off the extending flanges by centrifugal forces due to rotation of the guide rollers.

The arms carrying the guide rollers are arranged in such a manner as to apply a definite spring tension to the guide rollers and the construction is such as to permit ready removal of the spring and ready adjustment of the spring tension on the guide rollers.

The accessibility of the various parts for cleaning is an important factor and the provision of the actuating lever for the guide rollers as previously described is also a desirable feature.

The method of operating the fire shutter by hydraulic pressures created by the oil pump during the operation of the machine eliminates the use of governors and assures the positive operation of the fire shutter during any decrease in hydraulic pressures.

The light shutter mechanism may be either of the single cylindrical barrel type or of the concentric cylindrical type in which the inner and outer shutters revolve in opposite directions. This permits the passage of more light through the shutter and consequently provides a brighter picture upon projection.

The differential compensating device used in driving the concentric shutters when used is of novel design and may be readily adjusted during the framing adjustment of the machine. The use of the concentric shutters moving in opposite directions provides a high light efficiency with a critical cutting of the light beam. Such a shutter assembly may be set in the factory with precision instruments and completely synchronized with the other parts prior to its assembly as a unit in the machine.

The intermittence movement utilizes a Geneva movement having a star and cam and is provided with an eccentric collar which permits ready adjustment of the clearances of the star and cam, while preserving the bearing surface which has been developed in the movement during its operation. In conventional designs any change or adjustment of the star and cam causes a change in the aligned bearing surfaces. The construction shown is such that the bearing support and the adjustment take the variation in the intermittence sprocket rather than to throw the load on the Geneva movement. The whole intermittence movement is removable quickly as a unit and may thereafter be replaced or a new unit may be placed in the machine with all of the parts completely synchronized. In prior machines it has been conventional practice to disassemble the machine in order to remove the intermittence movement and no provision was made for assuring the synchronization of the replaced intermittence movement with the other parts of the machine. The removal of the intermittence movement as a unit without disturbing the timing of the shutter or any of the gears in the gear train is an important feature of the present invention.

All moving parts of the machine are supplied with oil under pressure from the oil sump by the oil pump. The oil pump also supplies oil under pressure for the automatic actuation of the fire shutter which assures that sufficient oil must be in the head of the machine to operate the fire shutter before the machine can be operated. This also prevents lifting of the fire shutter until the machine is operating at the desired speeds and also prevents operation of the machine in the event that there is an inadequate supply of oil in the head of the machine.

It will be seen that the machine is ventilated by the circulating air currents which are provided throughout the machine at the various places where it is desired to cool the projector. For example, the aperture plate is cooled by air flowing in through the ports which is drawn in by the centrifugal blower formed integrally as a part of the shutter assembly. In this manner the air is circulated through the machine without disturbing the light arc or causing distortion of the image due to chromatic aberration of the lens assembly. In conventional machines air used for cooling the film is not controlled as to its direction of flow and this frequently results in disturbing the arc in the arc lamp. Attempts have been made to prevent the air from the film blowing on the arc by the interposition of a glass between the shutter and the arc lamp. Such a glass plate reduces the efficiency of the light during projection. If the arc is disturbed by the flow of the cooling air, its efficiency likewise is impaired.

The aperture plate housing is easily locked and unlocked from the assembly and may be removed and replaced as a unit. The aperture plate and the film shoes are so formed as to provide adjustment of spring tension on the film shoes and is so formed with separate shoes and springs as to cut down the unsprung weight. The whole assembly is adjustable from the operating side of the machine and permits a variable spring tension on the shoes in contact with the film. Also, the adjustable tipping of the aperture plate permits its adjustment relative to the plane of the projection screen and eliminates "keystoning" in the projected images.

The framing light provided is such that it may be readily removed as a unit for replacement of the light bulb.

The aperture plate housing is locked in position and readily removed as a unit from the ma-machine, as previously described.

The electrical system of the machine is simplified and permits the ready removal of the projector head from the complete projector by the disconnection of the electrical plugs.

It will also be seen, as above described and as previously pointed out, that the projector head embodying the present invention permits the ready removal and replacement of all units which require service operations and repair or replacement in the machine. All of the gears and shafts are carried on a removable gear train carrier which is separately removable as a unit. The intermittence movement is contained in a single housing which may be removed as a unit, and as previously pointed out, the various other component assemblies and sub-assemblies of the invention may also be removed as units and replaced with new units or by the old units which have been repaired, cleaned or reconditioned and still remain in synchronization with the other parts of the machine.

Features disclosed but not claimed herein are being claimed in my co-pending applications Serial No. 377,531, filed February 5, 1941; Serial No. 379,962, filed February 21, 1941; Serial No. 383,523, filed March 15, 1941; Serial No. 391,258, filed May 1, 1941; Serial No. 393,507, filed May 15, 1941; Serial No. 421,114, filed December 1, 1941; Serial No. 447,251, filed June 16, 1942; Serial No. 447,252, filed June 16, 1942; and Serial No. 447,344, filed June 17, 1942.

I claim:

1. In a motion picture projector having a housing, a partition separating the interior of the housing into mechanism and film compartments, the combination of movable film gate and lens tube assemblies including nested carrier arms in the film compartment, supports for the nested carrier arms comprising three horizontally extending vertically spaced rods carried by said partition, the film gate carrier arm supportedly engaging the upper rod at two longitudinally spaced points and supportedly engaging the middle rod at one point and the lens tube carrier arm supportedly engaging the lower rod at two longitudinally spaced points and supportedly engaging the middle rod at a point spaced longitudinally from the point of engagement therewith of the film gate carrier arm.

2. In a motion picture projector having a housing including a film compartment, the combination of movable film gate and lens tube assemblies including nested carrier arms in the film compartment, vertically spaced supports in the film compartment for the nested carrier arms, the film gate carrier arm supportedly engaging one of said supports at two longitudinally spaced points and supportedly engaging another of said supports at a single point and the lens tube carrier arm supportedly engaging still another of said supports at two longitudinally spaced points and supportedly engaging said another of said supports at a point spaced longitudinally from the point of engagement therewith of the film gate carrier arm, motion transmitting means between the housing and each of said carrier arms, and separate manually operable means to actuate each of said motion transmitting means to selectively move the film gate or the lens tube longitudinally in the film compartment.

3. In a motion picture projector, a housing defining a film compartment, an aperture plate in the film compartment, a bracket detachably connected to the housing, a plurality of longitudinally extending rods detachably connected to the bracket, a pair of reversely disposed nested carrier arms each supportedly engaging said rods at three spaced points to provide a rigid mounting and for movement longitudinally of the aperture plate, film gate and lens tube assemblies mounted on said carrier arms, and manually operable means to move said carrier arms on the rods.

4. In a motion picture projector having a housing defining a film compartment, an aperture plate in the film compartment, film gate and lens tube assemblies in the film compartment, reversely disposed nested carrier arms for the film gate and lens tube assemblies, a plurality of longitudinally extending supports for said carrier arms whereby the film gate and lens tube assemblies may be moved longitudinally relative to the aperture plate, a bracket for said longitudinally extending supports, and fastening means to detachably connect the bracket to the housing whereby the film gate and lens tube assembly can be removed as a unit from the film compartment.

RAYMOND J. MILLER.